United States Patent
Yang et al.

(10) Patent No.: US 9,657,236 B2
(45) Date of Patent: May 23, 2017

(54) PROCESS FOR HYDROTREATING HEAVY RAW OILS

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Qinghe Yang, Beijing (CN); Dawei Hu, Beijing (CN); Shuling Sun, Beijing (CN); Jia Liu, Beijing (CN); Hong Nie, Beijing (CN); Xinqiang Zhao, Beijing (CN); Xuefen Liu, Beijing (CN); Dadong Li, Beijing (CN); Lishun Dai, Beijing (CN); Zhicai Shao, Beijing (CN); Tao Liu, Beijing (CN)

(73) Assignees: CHINA PETROLEUM & CHEMICAL CORPORATION, Beijing (CN); RESEARCH INSTITUTE OF PERTROLEUM PROCESSING, SINOPEC, Beijing (CN)

( * ) Notice: Subject to any disclaimer, the term of this patent is extended or adjusted under 35 U.S.C. 154(b) by 209 days.

(21) Appl. No.: 13/853,195

(22) Filed: Mar. 29, 2013

(65) Prior Publication Data
US 2014/0001090 A1 Jan. 2, 2014

(30) Foreign Application Priority Data

Mar. 31, 2012 (CN) .......................... 2012 1 0091130
Mar. 31, 2012 (CN) .......................... 2012 1 0091147
Mar. 31, 2012 (CN) .......................... 2012 1 0091158
Jan. 14, 2013 (CN) .......................... 2013 1 0012710
Jan. 14, 2013 (CN) .......................... 2013 1 0012712
Jan. 14, 2013 (CN) .......................... 2013 1 0012856
Jan. 14, 2013 (CN) .......................... 2013 1 0013088

(51) Int. Cl.
| | | |
|---|---|---|
| C10G 65/02 | (2006.01) |
| B01J 37/08 | (2006.01) |
| B01J 21/04 | (2006.01) |
| B01J 23/888 | (2006.01) |
| B01J 23/883 | (2006.01) |
| B01J 23/882 | (2006.01) |
| B01J 37/26 | (2006.01) |
| B01J 21/06 | (2006.01) |
| B01J 35/00 | (2006.01) |
| B01J 35/10 | (2006.01) |
| B01J 37/02 | (2006.01) |
| C10G 45/08 | (2006.01) |

(52) U.S. Cl.
CPC .............. *C10G 65/02* (2013.01); *B01J 21/04* (2013.01); *B01J 21/063* (2013.01); *B01J 23/882* (2013.01); *B01J 23/883* (2013.01); *B01J 23/888* (2013.01); *B01J 35/002* (2013.01); *B01J 35/0026* (2013.01); *B01J 35/1014* (2013.01); *B01J 35/1042* (2013.01); *B01J 35/1047* (2013.01); *B01J 35/1061* (2013.01); *B01J 37/0201* (2013.01); *B01J 37/0207* (2013.01); *B01J 37/26* (2013.01); *C10G 45/08* (2013.01); *C10G 2300/1033* (2013.01); *C10G 2300/70* (2013.01); *C10G 2300/708* (2013.01)

(58) Field of Classification Search
CPC ........ B01J 21/04; B01J 21/063; B01J 23/882; B01J 23/883; B01J 23/888; B01J 35/002; B01J 35/0026; B01J 35/1014; B01J 35/1042; B01J 35/1047; B01J 35/1061; B01J 37/0201; B01J 37/0207; B01J 37/26; C10G 2300/1033; C10G 2300/70; C10G 2300/708; C10G 45/08; C10G 65/02
See application file for complete search history.

(56) References Cited

U.S. PATENT DOCUMENTS

| | | | |
|---|---|---|---|
| 4,016,108 A | 4/1977 | Robson | |
| 4,724,226 A * | 2/1988 | Cheng et al. | 502/204 |
| 6,207,611 B1 | 3/2001 | Sun et al. | |
| 6,518,219 B1 | 2/2003 | Yang et al. | |
| 2009/0198076 A1 | 8/2009 | Guckel | |

FOREIGN PATENT DOCUMENTS

| | | |
|---|---|---|
| CN | 1169336 A | 1/1998 |
| CN | 1216316 A | 5/1999 |
| CN | 1057021 C * | 10/2000 |

(Continued)

OTHER PUBLICATIONS

Jiasong, Y. et al., "Study of the Acid Dispersion Property of Pseudoboehmite," *Petroleum Processing and Petrochemicals*, vol. 35, No. 9, 2004, pp. 10-13 (4 pages).

*Primary Examiner* — Renee Robinson
*Assistant Examiner* — Derek Mueller
(74) *Attorney, Agent, or Firm* — Novick, Kim & Lee, PLLC; Allen Xue

(57) ABSTRACT

The present invention relates to a catalyst combination for hydrotreating raw oils and a process for hydrotreating raw oils with the catalyst combination. The catalyst combination comprises one or both of at least one hydrogenation protection catalyst I and at least one hydrogenation demetalling catalyst I;

at least one hydrogenation demetalling catalyst II; and at least one hydrogenation treatment catalyst III.

19 Claims, No Drawings

(56) References Cited

FOREIGN PATENT DOCUMENTS

| | | | |
|---|---|---|---|
| CN | 1124890 | C | 10/2003 |
| CN | 1488441 | A | 4/2004 |
| CN | 1488441 | A | 4/2004 |
| CN | 1626279 | A | 6/2005 |
| CN | 1647857 | A | 8/2005 |
| CN | 1689702 | A | 11/2005 |
| CN | 1690172 | A | 11/2005 |
| CN | 1782031 | A | 6/2006 |
| CN | 1782031 | A | 6/2006 |
| CN | 101020845 | A | 8/2007 |
| CN | 101191077 | A * | 6/2008 |
| CN | 101343545 | A | 1/2009 |
| CN | 101928601 | A | 12/2010 |
| CN | 102039203 | A | 5/2011 |
| CN | 102247896 | A | 11/2011 |
| CN | 102259033 | A | 11/2011 |
| CN | 102465009 | A | 5/2012 |

* cited by examiner

PROCESS FOR HYDROTREATING HEAVY RAW OILS

TECHNICAL FIELD

The present invention relates to a catalyst combination for hydrotreating raw oils such as heavy raw oils, and a process for hydrotreating raw oils such as heavy raw oils.

BACKGROUND

Heavy raw oils (such as residual oil) contain a large quantity of metal impurities such as Fe, Ca, Ni and V and intractable large molecule substances such as asphaltine and resin. These substances tend to cause metal depositing on the catalyst surface and the catalyst coking and deactivation in the production process, and therefore influence the product quality and reduce the operation period. Therefore, the hydrogenation conversion of asphaltine and the removal and accommodation of the metal impurities are the key issue in the hydrogenation process of heavy raw oils.

CN1690172A discloses a hydrogenation demetalling catalyst for residual oil, which catalyst contains a dual-pore alumina support and metal components such as molybdenum and/or tungsten and nickel and/or cobalt loaded on the support, wherein in the support, the pore volume of the pores having a pore diameter of 10-20 nm comprises 35-80% of the total pore volume, the pore volume of the pores having a pore diameter of 500-1200 nm comprises 15-60% of the total pore volume, and the pore volume of the pores having a pore diameter of <10 nm or from >20 nm to <500 nm, or >1200 nm comprises 540% of the total pore volume. It is said that this catalyst has a high hydrogenation demetalling activity and a low carbon deposit. Nevertheless, there is still a demand in the prior art to develop a catalyst with better properties.

SUMMARY

The present invention provides a catalyst combination, which can be used to hydrotreat heavy raw oils. In one aspect, the present invention provides a catalyst combination, which has a good hydrogenation conversion capability for asphaltine. In another aspect, the present invention provides a catalyst combination, which has a good metal accommodation capability in the hydrogenation of heavy raw oils. Yet in another aspect, the present invention provides a catalyst combination, which has both a good hydrogenation conversion capability for asphaltine and a good metal accommodation capability in the hydrogenation of heavy raw oils.

Based on said catalyst combination(s), the present invention provides a hydrotreating process for heavy raw oils.

In one aspect, the present invention provides a hydrotreating process for heavy raw oils, which process has a good hydrogenation conversion capability for asphaltine. In another aspect, the present invention provides a hydrotreating process for heavy raw oils, which process has a good metal accommodation capability in the hydrogenation of heavy raw oils. Yet in another aspect, the present invention provides a hydrotreating process for heavy raw oils, which process has both a good hydrogenation conversion capability for asphaltine and a good metal accommodation capability in the hydrogenation of heavy raw oils.

Based on the above findings, the present invention is accomplished. Specifically, the present invention provides the following technical solutions:

1. A catalyst combination for hydrotreating raw oils such as heavy raw oils, which comprises
   one or both of at least one hydrogenation protection catalyst I and at least one hydrogenation demetalling catalyst I;
   at least one hydrogenation demetalling catalyst II; and
   at least one hydrogenation treatment catalyst III,
   wherein, the content of said hydrogenation demetalling catalyst II in said catalyst combination, by volume and based on the total volume of the catalyst combination, is 5-50%;
   wherein, said hydrogenation demetalling catalyst II has a support, which is a shaped alumina support,
   the support has a pore volume measured by the mercury porosimetry of 0.94.2 mL/g, preferably 0.95-1.15 mL/g;
   the support has a specific surface area of 50-300 m$^2$/g, preferably 80-200 m$^2$/g;
   the support has a ratio of the volume of the pores having a diameter of 1.0 nm-30 nm to the total pore volume of 55-80%, preferably 55-72%, more preferably 59-66%;
   the support has a ratio of the volume of the pores having a diameter of 300 nm-500 nm to the total pore volume of 10-35%, preferably 18-35%, more preferably 26-32%.

2. The catalyst combination according to any one of the previous solutions, wherein the catalyst combination comprises the hydrogenation protection catalyst I, the hydrogenation demetalling catalyst II and the hydrogenation treatment catalyst III, wherein by volume and based on the total volume of the catalyst combination, the content of the hydrogenation protection catalyst I is 5-60%, e.g. 10-50%, or 10-35%, the content of the hydrogenation demetalling catalyst II is 5-50%, e.g. 10-40%, or 20-40%, and the content of the hydrogenation treatment catalyst III is 10-60%, e.g. 20-50%, or 35-60%; the hydrogenation protection catalyst I has a bed voidage of 25-60%, preferably 30-50%;
   or
   the catalyst combination comprises the hydrogenation demetalling catalyst I, the hydrogenation demetalling catalyst II and the hydrogenation treatment catalyst III, wherein by volume and based on the total volume of the catalyst combination, the content of the hydrogenation demetalling catalyst I is 5-60%, e.g. 10-50%, or 10-35%, the content of the hydrogenation demetalling catalyst II is 5-50%, e.g. 10-40%, or 20-40%, and the content of the hydrogenation treatment catalyst III is 10-60%, e.g. 20-50%, or 35-60%.

3. The catalyst combination according to any one of the previous solutions, wherein the hydrogenation protection catalyst I has at least one hydrogenation active metal element, wherein the hydrogenation active metal element of the hydrogenation protection catalyst I can be at least one metal element selected from the group consisting of the metal elements in the group VIII of the Periodic Table and the metal elements in the group VIB of the Periodic Table;
   calculated as oxide and based on the hydrogenation protection catalyst I, the content of the metal element in the group VIII of the Periodic Table is from more than zero to no more than 5 wt %, preferably 0.1-3 wt %, more preferably 0.5-2.5 wt %;
   calculated as oxide and based on the hydrogenation protection catalyst I, the content of the metal element in the group VIB of the Periodic Table is from more than zero to no more than 10 wt %, preferably 0.5-8 wt %, more preferably 3.5-8 wt %;
   preferably, the metal element in the group VIII of the Periodic Table is nickel and/or cobalt; preferably, the metal element in the group VIB of the Periodic Table is molybdenum and/or tungsten;

the support of the hydrogenation protection catalyst I has a crushing strength of 20-300N/particle, preferably 50-200N/particle, more preferably 70-200N/particle;

the support of the hydrogenation protection catalyst I has a pore volume of 0.3-0.9 mL/g, preferably 0.4-0.8 mL/g, more preferably 0.4-0.7 mL/g;

the support of the hydrogenation protection catalyst I has a specific surface area of from more than 30 to no more than 150 m$^2$/g, preferably from more than 50 to no more than 140 m$^2$/g, more preferably, from more than 80 to no more than 120 m$^2$/g.

4. The catalyst combination according to any one of the previous solutions, wherein the support of the hydrogenation protection catalyst I can be a titanium oxide-alumina shaped body;

based on the support, the support has an alumina content of 70-99 wt %, for example 75-96 wt %, e.g. 85-96 wt %, and a titanium oxide content of 1-30 wt %, for example 4-25 wt %, e.g. 4-15 wt %.

5. The catalyst combination according to any one of the previous solutions, wherein, the support of the hydrogenation demetalling catalyst I can be a shaped alumina support, wherein the shaped alumina support has a pore volume of 0.8 mL/g-1.2 mL/g, a specific surface area of 90 m$^2$/g-230 m$^2$/g, a most probable pore diameter of 20 nm-30 nm, an average pore diameter of 25 nm-35 nm, the ratio of the volume of the pores having a diameter of 10 nm-60 nm to the total pore volume of 95%-99.8%;

the hydrogenation demetalling catalyst I has at least one hydrogenation active metal element, wherein the hydrogenation active metal element of the hydrogenation demetalling catalyst I can be at least one metal element selected from the group consisting of the metal elements in the group VIII of the Periodic Table and the metal elements in the group VIB of the Periodic Table;

calculated as oxide and based on the catalyst, the content of the metal element in the group VIII of the Periodic Table is from more than zero to no more than 5 wt %, preferably 0.1-3 wt %;

calculated as oxide and based on the catalyst, the content of the metal element in the group VIB of the Periodic Table is from more than zero to no more than 15 wt %, preferably 0.5-10 wt %;

preferably, the metal element in the group VIII of the Periodic Table is nickel and/or cobalt; preferably, the metal element in the group VIB of the Periodic Table is molybdenum and/or tungsten.

6. The catalyst combination according to any one of the previous solutions, wherein the hydrogenation demetalling catalyst II has at least one hydrogenation active metal element, wherein the hydrogenation active metal element of the hydrogenation demetalling catalyst II can be at least one metal element selected from the group consisting of the metal elements in the group VIII of the Periodic Table and the metal elements in the group VIB of the Periodic Table; calculated as oxide and based on the hydrogenation demetalling catalyst II, the content of the metal element in the group VIII of the Periodic Table is from more than zero to no more than 3 wt %; preferably from more than 0.8 to no more than 3 wt %, more preferable from more than 1 to no more than 2 wt %; or preferably from more than zero to no more than 0.8 wt %, more preferably from more than 0.1 to no more than 0.6 wt %; and/or calculated as oxide and based on the hydrogenation demetalling catalyst II, the content of the metal element in the group VIB of the Periodic Table is from more than zero to no more than 15 wt %; preferably from more than 3 to no more than 10 wt %, more preferably from more than 4 to no more than 8 wt %; or preferably from more than zero to no more than 4 wt %, more preferably from more than 1.5 to no more than 3.5 wt %;

preferably, the metal element in the group VIII of the Periodic Table is nickel and/or cobalt; preferably, the metal element in the group VIB of the Periodic Table is molybdenum and/or tungsten.

7. The catalyst combination according to any one of the previous solutions, wherein the hydrogenation treatment catalyst III comprises at least one support selected from alumina and/or silica-alumina, at least one hydrogenation active metal element selected from the group consisting of nickel, cobalt, molybdenum, tungsten and a combination thereof, optionally at least one auxiliary agent selected from the group consisting of fluorine, boron, phosphorus and a combination thereof;

preferably, Calculated as oxide and based on the catalyst III, the content of nickel and/or cobalt is 1-5 wt %, the content of molybdenum and/or tungsten is 10-35 wt %, calculated as the element, the content of at least one auxiliary agent selected from the group consisting of fluorine, boron, phosphorus and a combination thereof is 0-9 wt %.

8. The catalyst combination according to any one of the previous solutions, wherein, said hydrogenation demetalling catalyst II has a support, which is a shaped boron-containing alumina support, wherein the support has a boron content (as B2O3) of 0.1-6 wt %, preferably 0.3-4 wt %.

9. A process for hydrotreating raw oils, which process comprises, under the following reaction conditions, using the catalyst combination according to any one of the previous solutions to hydrotreating heavy raw oils:

the hydrogen partial pressure is 6-20 MPa, the temperature is 300-450° C., the liquid-volume hourly space velocity is 0.1-1.0 h$^{-1}$, and the hydrogen/oil volume ratio is 600-1500; or the hydrogen partial pressure is 10-18 MPa, the temperature: 350-420° C., the liquid-volume hourly space velocity is 0.2-0.6 h$^{-1}$, and the hydrogen/oil volume ratio is 750-1100, wherein, in the order of the hydrogenation protection catalyst I and/or the hydrogenation demetalling catalyst I, the hydrogenation demetalling catalyst II, and the hydrogenation treatment catalyst III, the raw oil is contacted with the catalyst.

10. The process of solution 9, wherein said raw oil is a heavy raw oil, which has one or more of the following properties: (1) asphaltine content>7 wt %; (2) Fe+Ca content>20 ppmw; (3) Ni+V content>80 ppmw; (4) sulfur content>3 wt %; (5) residual carbon content>10 wt %.

In the present catalyst combination for hydrotreating heavy raw oils, the hydrogenation demetalling catalyst II comprises a specific alumina support, wherein the support has a ratio of the volume of the pores having a diameter of 10 nm-30 nm to the total pore volume of 55-80%, e.g. 55-72%, or 59-66%; the support has a ratio of the volume of the pores having a diameter of 300 nm-500 nm to the total pore volume of 10-35%, e.g. 18-35%, or 26-32%. In comparison, the small pores (having a pore diameter of 10 nm-30 nm) in the present invention are much more than the corresponding small pores in CN1690172A, while the large (having a pore diameter of 300 nm-500 nm) in the present invention are also much more than the corresponding small pores in CN1690172A. In other words, the small pores (having a pore diameter of 10 nm-30 nm) in the present invention have a larger pore diameter than the small pores in CN1.690172A; while the large pores (having a pore diameter of 300 nm-500 nm) in the present invention have a smaller pore diameter than the large pores in CN1690172A.

In the present catalyst combination for hydrotreating heavy raw oils, the hydrogenation demetalling catalyst II may comprise less hydrogenation active metal elements.

EMBODIMENTS

Hydrogenation Protection Catalyst I

According to the present invention, the hydrogenation protection catalyst I (hereinafter, also called as the hydrogenation protection catalyst CI) has a function of removing Fe and Ca in raw oil, at least partly removing resin and residual carbon, and effectively depositing and accommodating the removed impurities such as Fe, Ca and residual carbon.

It is found that the bed voidage of the hydrogenation protection catalyst I has a direct effect on the above function of the hydrogenation protection catalyst I. The preferable hydrogenation protection catalyst I has a bed voidage of 25-60%, e.g. 30-50%. Under this precondition, according to the present invention, there is not any specific limitation to the hydrogenation protection catalyst I, which can be a commercially available product, or can be produced with any technique known in the prior art.

Hydrogenation Active Metal Element

The hydrogenation protection catalyst I can have at least one hydrogenation active metal element. For example, the hydrogenation active metal element of the hydrogenation protection catalyst I can be at least one metal element selected from the group consisting of the metal elements in the group VIII of the Periodic Table and the metal elements in the group VIB of the Periodic Table. For example, the hydrogenation active metal element can be the combination of at least one metal element in the group VIII of the Periodic Table and at least one metal element in the group VIB of the Periodic Table. It is preferable that the metal element in the group VIII of the Periodic Table is nickel and/or cobalt. It is preferable that the metal element in the group VIB of the Periodic Table is molybdenum and/or tungsten. Calculated as oxide and based on the hydrogenation protection catalyst I, the content of the metal element in the group VIII of the Periodic Table is from more than zero to no more than 5 wt %, preferably 0.1-3 wt %, and more preferably 0.5-2.5 wt %; the content of the metal element in the group VIB of the Periodic Table is from more than zero to no more than 10 wt %, preferably 0.5-8 wt %, and more preferably 3.5-8 wt %.

Bed Voidage

As a prerequisite to ensure that the final catalyst has a bed voidage of 25-60%, preferably 30-50%, there is not any specific limitation to the form of the shaped support according to the present invention. For example, the shaped support can in form of honeycomb-like columns, rasching rings, or spheres containing pore-channels.

According the present invention, the bed voidage is a physical property parameter, which characterizes the building-up property of the shaped bodies. The bed voidage can be determined by placing the shaped bodies to be measured in a vessel with a one-liter mark (having an inner diameter 20 times larger than the average particle diameter of the shaped bodies to be measured) to the level of one-liter mark in term of the industrial charging density, then adding the pure water slowly until the catalyst adsorbs water to be saturated, continuing to add water to the level of one-liter mark, removing the catalyst particles by filtration, and measuring the residual liquid volume (in unit of liter). The bed voidage of the catalyst is the residual liquid volume (L)/1 (L)×100%.

Support

According to the present invention, there is not any specific limitation to the support of the hydrogenation protection catalyst I. It is preferable that the support has a crushing strength of 20-300N/particle, preferably 50-200N/particle, more preferably 70-200N/particle. It is preferable that the support has a pore volume of 0.3-0.9 mL/g, preferably 0.4-0.8 mL/g, and more preferably 0.4-0.7 mL/g. It is preferable that the support has a specific surface area of from more than 30 to no more than 150 $m^2/g$, preferably from more than 50 to no more than 140 $m^2/g$, more preferably from more than 80 to no more than 120 $m^2/g$. The support can be a commercially available product, or can be produced with any technique known in the prior art.

In a preferable embodiment, the support of the hydrogenation protection catalyst I is selected from the group consisting of titanium oxide-alumina shaped bodies. Based on the support, the support has an alumina content of 70-99 wt %, for example 75-96 wt %, and e.g. 85-96 wt %, and a titanium oxide of 1-30 wt %, for example 4-25 wt %, and e.g. 4-15 wt %.

Catalyst Preparation

For example, in case that titanium oxide-alumina shaped bodies are chosen as the support for preparing the hydrogenation protection catalyst I, the preparation of the catalyst includes the steps of preparing the support, and loading the hydrogenation active metal element(s) on the support. The support can be prepared by a method including the following steps:

(1) Mixing a hydrated alumina and a titanium-containing compound and shaping the resulting mixture;

(2) Drying and calcining the shaped bodies obtained in the step (1). The drying is conducted at 60-300° C. and/or for 1-10 hrs. The calcining is conducted at 600-1000° C. and/or for 1-10 hrs. Preferably, the drying is conducted at 100-250° C. and/or for 2-8 hrs; and the calcining is conducted at 700-1000° C., preferably at 850-1000° C., and/or for 2-5 hrs.

In the step (1), the hydrated alumina and the titanium-containing compound are used in such amounts that the alumina content in the final shaped body is 70-99 wt %, for example 75-96 wt %, and the titanium oxide content is 1-30 wt %, for example 4-25 wt %.

The method for preparing the shaped support can be any method known in the prior art. There is not any specific limitation thereto.

For example, the shaping may be a shaping by extrusion through a die, a shaping by rolling, a shaping by tabletting, or a combination thereof. Taken the shaping by extrusion into strips as an example, in order to make the shaping smooth, it is possible to add water, an extrusion aid and/or a binder to the shaping material such as a mixture of the hydrated alumina and titanium oxide, and then the mixture is shaped by extrusion, and then dried and calcined. The kinds and the amounts of the extrusion aid and the binder are well known by the skilled person in the art. For example, the common extrusion aid can be one or more of sesbania powder, methyl cellulose, starch, polyvinyl alcohol, polyethylene glycol. The binder can be an inorganic, acid and/or an organic acid. The shaping is preferably conducted so that the shaped support is in form of honeycomb-like columns, rasching rings, or spheres containing pore-channels.

The drying and the calcining can be conducted in a manner that is conventional in the prior art and under the conditions that are conventional in the prior art.

The hydrated alumina can be one or more of alumina trihydrate, alumina monohydrate and amorphous aluminum hydroxide, preferably pseudoboehmite. They can be a commercially available product, or can be produced with any technique known in the prior art.

The titanium-containing compound can be one or more of titanium oxide, a titanate, a titanium-containing molecular sieve, and a titanium-containing hydrated alumina, preferably titanium oxide and a titanate.

As a prerequisite to ensure that the hydrogenation active metal element can be loaded on the support, there is not any specific limitation to the method of loading the hydrogenation active metal element. The preferable method is an impregnation method, which includes formulating an impregnation solution with a compound containing the metal, impregnating the support with the impregnation solution, drying, and optionally calcining.

The impregnation method can be a conventional method, for example, an excessive impregnation method or a pore saturation impregnation method. For example, the support can be impregnated with a solution containing an excessive amount of a compound having the metal element in the group VIII of the Periodic Table and/or a compound having the metal element in the group VIB of the Periodic Table, or can be impregnated by pore saturation with a solution containing a compound having the metal element in the group VIII of the Periodic Table and/or a compound having the metal element in the group VIB of the Periodic. Table, then dried, and optionally calcined. Calculated as oxide and based on the catalyst, said impregnation is conduced in such a manner that, in the final catalyst, the content of the metal element in the group VIII of the Periodic Table is from more than zero to no more than 5 wt %, preferably 0.1-3 wt %, more preferably 0.5-2.5 wt %, the content of the metal element in the group VIB of the Periodic Table is from more than zero to no more than 10 wt %, preferably 0.5-8 wt %, more preferably 3.5-8 wt %.

The drying and the calcining are conventional methods. Preferably, the drying is conducted at 60-150° C. and/or for 110 hrs. More preferably, the drying is conducted at 80-120° C. and/or for 2-8 hrs. Preferably, the calcining is conducted at 350-550° C. and/or for 1-6 hrs. More preferably, the calcining is conducted at 400-500° C. and/or for 2-4 hrs.

The compound having the metal element in the group VIB of the Periodic Table can be at least one soluble compound having the metal element in the group VIB of the Periodic Table, such as one or more of molybdenum oxide, a molybdate and a paramolybdate, preferably one or more of molybdenum oxide, ammonium molybdate and ammonium paramolybdate; and/or such as one or more of a tungstate, a metatungstate and an ethyl metatungstate, preferably one or more of ammonium metawoiframate and ethyl ammonium metawolframate.

The compound having the metal element in the group VIII of the Periodic Table can be at least one soluble compound having the metal element in the group VIII of the Periodic Table, such as one or more of cobalt nitrate, cobalt acetate, basic cobalt carbonate, cobalt chloride and a dissolvable cobalt-containing complex, preferably one or more of cobalt nitrate and basic cobalt carbonate; or such as one or more nickel nitrate, nickel acetate, basic nickel carbonate, nickel chloride and a dissolvable nickel-containing complex, preferably one or more of nickel nitrate and basic nickel carbonate.

Additional Elements

According to the present invention, the hydrogenation protection catalyst I can further contain any additional element which does not affect the catalytic performance of the catalyst or can improve the catalytic performance of the catalyst. For example, the catalyst can contain the additional element such as P, halogen, and alkaline earth metal.

For the halogen, based on the catalyst and calculated as halogen atom, the content of halogen is no more than 10 wt %, preferably 0.14 wt %. For other additional elements, calculated as oxide and based on the catalyst, the content of additional element is no more than 10 wt %, preferably 0.14 wt %.

In case that the catalyst further contains the additional element such as P, halogen, and alkaline earth metal, the introduction method of the additional element can be any possible method. For example, the compound having the additional element such as P, halogen and alkaline earth metal is directly mixed with the starting materials for preparing the support (such as titanium oxide-alumina), and the mixture is shaped and calcined; or the compound having the additional element such as P, halogen and alkaline earth metal and the compound having the hydrogenation active metal element are formulated into a mixed solution, and the support is impregnated with this mixed solution; or the compound having the additional element such as P, halogen and alkaline earth metal is formulated alone into a solution, and the support is impregnated with this solution and calcined. In case that the additional element such as P, halogen and alkaline earth metal and the hydrogenation active metal element are separately introduced into the support, it is preferable that the support is firstly impregnated with a solution containing the compound having the additional element such as P, halogen and alkaline earth metal and calcined, and then impregnated with a solution containing the compound having the hydrogenation active metal element.

The calcining is conducted at 400-600° C., preferably 420-500° C. and/or for 2-6 hrs, preferably 3-6 hrs.

Hydrogenation Demetalling Catalyst I

According to the present invention, the hydrogenation demetalling catalyst (hereinafter, also called as the hydrogenation demetalling catalyst CI) has a function of removing, depositing and accommodating some metal impurities such as nickel (Ni) and vanadium (V) in raw oil. As a prerequisite to ensure that this function can be accomplished, according to the present invention, there is not any specific limitation to the hydrogenation demetalling catalyst I.

The hydrogenation demetalling catalyst I can be a commercially available product, or can be produced with any technique known in the prior art.

In a preferable embodiment, the hydrogenation demetalling catalyst I is a hydrogenation demetalling catalyst, in which alumina is used as the support. The catalyst contains a shaped alumina support and at least one hydrogenation active metal element, wherein the shaped alumina support has a pore volume of 0.8 mL/g, a specific surface area of 90 $m^2/g$-230 $m^2/g$, a most probable pore diameter of 20 nm-30 nm, an average pore diameter of 25 nm-35 nm, and a ratio of the volume of the pores having a diameter of 10 nm-60 nm to the total pore volume of 95%-99.8%. The hydrogenation active metal element in the catalyst can be at least one metal element selected from the group consisting of the metal elements in the group VIII of the Periodic Table and the metal elements in the group VIB of the Periodic Table. For example, the hydrogenation active metal element can be the combination of at least one metal element in the group VIII of the Periodic Table and at least one metal element in the group VIB of the Periodic Table. Calculated as oxide and based on the catalyst, the content of the metal element in the group VIII of the Periodic Table is from more than zero to no more than 5 wt %, and the content of the metal element in the group VIB of the Periodic Table is from more than zero to no more than 15 wt %. It is preferable that the metal element in the group VIII of the Periodic Table is cobalt and/or nickel. It is also preferable that the metal element in the group VIB of the Periodic Table is molybdenum and/or tungsten. It is preferable that, calculated as oxide and based on the catalyst, the content of the metal element in the group VIII of the Periodic Table in the hydrogenation demetalling catalyst I is 0.1-3 wt %, and the content of the metal element in the group VIB of the Periodic Table is 0.5-10 wt %.

For example, the Chinese patent application 201010188605.X discloses a catalyst meeting the above requirement and its preparation, and therefore is incorporated herein by reference.

Additional Elements

According to the present invention, the hydrogenation demetalling catalyst I can further contain any additional element which does not affect the catalytic performance of the catalyst or can improve the catalytic performance of the catalyst. For example, the catalyst can contain the additional element such as P, halogen, and alkaline earth metal.

For the halogen, based on the catalyst and calculated as halogen atom, the content of halogen is no more than 10 wt %, preferably 0.1-4 wt %. For other additional elements, calculated as oxide and based on the catalyst, the content of additional element is no more than 10 wt %, preferably 0.1-4 wt %.

In case that the catalyst further contains the additional element such as P, halogen, and alkaline earth metal, the introduction method of the additional element can be any possible method. For example, the compound having the additional element such as P, halogen and alkaline earth metal is directly mixed with the starting materials for preparing the support (such as alumina), and the mixture is shaped and calcined; or the compound having the additional element such as P, halogen and alkaline earth metal and the compound having the hydrogenation active metal element are formulated into a mixed solution, and the support is impregnated with this mixed solution; or the compound having the additional element such as P, halogen and alkaline earth metal is formulated alone into a solution, and the support is impregnated with this solution and calcined. In case that the additional element such as P, halogen and alkaline earth metal and the hydrogenation active metal element are separately introduced into the support, it is preferable that the support is firstly impregnated with a solution containing the compound having the additional element such as P, halogen and alkaline earth metal and calcined, and then impregnated with a solution containing the compound having the hydrogenation active metal element.

The calcining is conducted at 400-600° C., preferably 420.500° C. and/or for 2-6 hrs, preferably 3.6 hrs.

Hydrogenation Demetalling Catalyst II

According to the present invention, the hydrogenation demetalling catalyst II (hereinafter, also called as the hydrogenation demetalling catalyst CII) is used downstream from the hydrogenation protection catalyst I and/or the hydrogenation demetalling catalyst I. The hydrogenation demetalling catalyst II has a function of further converting the large molecule compounds such as asphaltine and resin in raw oil, effectively removing the metal impurities such as Ni and V in raw oil, and partially removing the compounds containing S and/or N in raw oil.

Hydrogenation Active Metal Element

The hydrogenation demetalling catalyst II can have at least one hydrogenation active metal element. For example, the hydrogenation active metal element of the hydrogenation demetalling catalyst II can be at least one metal element selected from the group consisting of the metal elements in the group VIII of the Periodic Table and the metal elements in the group VIB of the Periodic Table. For example, the hydrogenation active metal element can be the combination of at least one metal element in the group VIII of the Periodic Table and at least one metal element in the group VIB of the Periodic Table. It is preferable that the metal element in the group VIII of the Periodic Table is nickel and/or cobalt. It is also preferable that the metal element in the group VIB of the Periodic Table is molybdenum and/or tungsten.

In an embodiment, calculated as oxide and based on the hydrogenation demetalling catalyst II, the content of the metal element in the group VIII of the Periodic Table is from more than zero to no more than 3 wt %, the content of the metal element in the group VIB of the Periodic Table is from more than zero to no more than 15 wt %.

In an embodiment, calculated as oxide and based on the hydrogenation demetalling catalyst II, the content of the metal element in the group VIII of the Periodic Table is from more than 0.8 to no more than 3 wt %, the content of the metal element in the group VIB of the Periodic Table is from more than 3 to no more than 10 wt %.

In an embodiment, calculated as oxide and based on the hydrogenation demetalling catalyst II, the content of the metal element in the group VIII of the Periodic Table is from more than 1 to no more than 2 wt %, the content of the metal element in the group VIB of the Periodic Table is from more than 4 to no more than 8 wt %.

In an embodiment, calculated as oxide and based on the hydrogenation demetalling catalyst II, the content of the metal element in the group VIII of the Periodic Table is from more than zero to no more than 0.8 wt %, the content of the metal element in the group VIB of the Periodic Table is from more than zero to no more than 4 wt %.

In an embodiment, calculated as oxide and based on the hydrogenation demetalling catalyst II, the content of the metal element in the group VIII of the Periodic Table is from more than 0.1 to no more than 0.6 wt %, the content of the metal element in the group VIB of the Periodic Table is from more than 1.5 to no more than 3.5 wt %.

Support

According to the present invention, the support of the hydrogenation demetalling catalyst II is a shaped alumina support optionally containing boron. The support has a pore volume measured by the mercury porosimetry, of 0.9-1.2 mL/g, preferably 0.95-1.15 mL/g; the support has a specific surface area of 50-300 m$^2$/g, preferably 80-200 m$^2$/g; the support has a ratio of the volume of the pores having a diameter of 10 nm-30 nm to the total pore volume of 55-80%, preferably 55-72%, more preferably 59-66%; the support has a ratio of the volume of the pores having a diameter of 300 nm-500 nm to the total pore volume of 10-35%, preferably 18-35%, more preferably 26-32%. If boron is present, the support has a boron content of 0.1-6 wt %, preferably 0.3-4 wt %.

Catalyst Preparation

According to the present invention, the preparation of hydrogenation demetalling catalyst II includes the steps of preparing the support, and loading the hydrogenation active metal element(s) on the support.

Support Preparation

The support preparation includes mixing a pseudoboehmite-containing hydrated alumina P1 and a P1's modifier P2, optionally introducing a boron-containing compound, shaping the mixture, and drying and calcining the shaped bodies, wherein the weight mixing ratio of P1 to P2 is 20-95:5-80, preferably 70-95:5-25. The weight mixing ratio of P1 to P2 means a ratio of the weight part of P1 to the weight part of P2 per 100 parts of the mixture of P1 and P2. P2 has a κ value of from 0 to no more than 0.9, preferably from 0 to no more than 0.6, wherein κ=DI2/DI1, DI1 is the acid dispersion index of the pseudoboehmite-containing hydrated alumina P1, and DI2 is the acid dispersion index of the modifier of the pseudoboehmite-containing hydrated alumina (P1's modifier P2).

In the support preparation, the acid dispersion index DI refers to a weight percent (as Al2O3) of the pseudoboehmite-containing hydrated alumina dispersed in a certain reaction time after adding nitric acid in a certain acid/Al ratio to the pseudoboehmite-containing hydrated alumina, i.e. DI=(1−W2/W1)×100%, wherein W1 and W2 respectively refer to the weight (as Al2O3) of the pseudoboehmite-containing hydrated alumina before and after the reaction with the acid.

The measurement of DI includes: (1) determining the ignition basis fraction of the pseudoboehmite-containing hydrated alumina (the ignition basis fraction is also called as the dry basis weight percent, and refers to the ratio of the weight after a certain amount of the pseudoboehmite-containing hydrated alumina is calcined at 600° C. for 4 hrs and the weight before the calcination), expressed as a; (2) weighing W0 grams of the pseudoboehmite-containing hydrated alumina with an analytical balance, wherein W0 is such an amount that W1 as Al2O3 is 6 g (W1=a/W0), weighing W grams of deionized water, wherein W=40.0−W0, adding the weighed pseudoboehmite-containing hydrated alumina and the weighed deionized water to a beaker and mixing them under stirring; (3) adding 20 mL of 0.74N dilute nitric acid with a 20 mL pipette to the beaker in the step (2) to conduct the reaction under stirring for 8 hrs; (4) separating the reaction slurry obtained from the step (3) in a centrifuge, placing the resulting precipitate in a crucible with a known weight to be dried at 125° C. for 4 hrs and calcined at 850° C. in a muffle furnace for 3 hrs, and obtaining the weight of the calcined sample W2 by weighing the sample; and (5) calculating DI according to the equation DI=(1−W2/W1)×100%.

Calculated as oxide and based on the support, a certain amount of the boron-containing compound is introduced so that in the final support, the boron content is 0.1-6 wt %, preferably 0.3-4 wt %.

The conditions for drying the shaped bodies include: the temperature: 40-350° C., the time: 1-24 hrs, preferably the temperature: 100-200° C., the time: 2-12 hrs.

The conditions for calcining the shaped bodies include: the temperature: from more than 500 to no more than 1200° C., the time: 1-8 hrs, preferably the temperature: from more than 800 to no more than 1000° C., the time: 2-6 hrs.

The method for modifying P1 into P2 includes one of the following methods:
(1) The pseudoboehmite-containing hydrated alumina P1 is shaped; the shaped bodies are dried at 40-350° C., preferably 100-200° C. and for 1-24 hrs, preferably 2-12 hrs, some or all of the dried shaped bodies are ground and sieved to obtain P2 as powder.
(2) The shaped bodied obtained in the above (1) are calcined at a temperature of from 350 to no more than 1400° C., preferably 500-1200° C. and for 1-8 hrs, preferably 0.1-6 hrs, some or all of the calcined shaped bodies are ground and sieved to obtain P2 as powder.
(3) The pseudoboehmite-containing hydrated alumina P1 is flash-dried at a temperature of from more than 150 to no more than 1400° C., preferably 200-1000° C., and for 0.05-1 hr, preferably 0.1-0.5 hrs to obtain P2 as powder.
(4) The combination of two or more modifiers obtained from the above (1), (2) and/or (3).

In the practices, P2 can be obtained economically by one of the following methods:
(1) In this embodiment based on the drying procedure, P2 is obtained as follows: During the preparation of the conventional alumina support including shaping the pseudoboehmite-containing hydrated alumina P1 according to the conventional procedure, the waste materials are by-produced from drying the shaped bodies. For example, during the strip extrusion, the waste materials are by-produced from drying and re-shaping the shaped bodies in form of strips. These waste materials can be ground and sieved to obtain P2.
(2) In this embodiment based on the calcining procedure, P2 is obtained as follows: During the preparation of the conventional alumina support including shaping the pseudoboehmite-containing hydrated alumina P1 according to the conventional procedure, the waste materials are by-produced from calcining the shaped bodies. For example, during the shaping by rolling, the waste materials are by-produced from calcining the shaped bodies in form of spheres. These waste materials can be ground and sieved to obtain P2.
(3) Alternatively, P1 can be flash-dried to obtain P2. The flash-drying temperature can be 0.05-1 hr, preferably 0.1-0.5 hrs,
(4) The combination of two or more modifiers obtained from the above (1), (2) and/or (3).

In the case of obtaining P2 by the combination, the ratio of the modifiers P2 obtained from (1), (2) and/or (3) can be adjusted appropriately as demanded. The present invention has no limitation thereto.

The pseudoboehmite-containing hydrated alumina P1 can be the pseudoboehmite prepared by any technique known in the prior art; or a mixture of pseudoboehmite and at least one other hydrated alumina. The other hydrated alumina can be selected from the group consisting of alumina trihydrate, alumina monohydrate, amorphous aluminum hydroxide and a combination thereof. In a preferable embodiment, the pseudoboehmite-containing hydrated alumina has a pseudoboehmite content as characterized by X-ray diffraction of no less than 50%, preferably no less than 60%.

It is preferable that the pseudoboehmite-containing hydrated alumina P1 has a pore volume of 0.9-1.4 mL/g, a specific surface area of 100-350 m$^2$/g, and a most probable pore diameter of 8-30 nm; or it is preferable that the pseudoboehmite-containing hydrated alumina P1 has a pore volume of 0.95-1.3 mL/g, a specific surface area of 120-300 m$^2$/g, and a most probable pore diameter of 10-25 nm.

According to the present invention, the pore volume, the specific surface area and the most probable pore diameter of the pseudoboehmite-containing hydrated alumina is obtained by the BET nitrogen adsorption after the pseudoboehmite-containing hydrated alumina is calcined at 600° C. for 4 hrs.

It is preferable that the P2s are the particles of 80-300 meshes, preferably 100-200 meshes. Herein, the particles of 80-300 meshes, or preferably the particles of 100-200 meshes are meant to these modifiers, whose sieved particles (undersize) satisfying the 80-300 meshes particles or the preferable 100-200 meshes particles comprise no less than 60%, preferably no less than 70% by weight of the total particles, upon being passed through the screen (if necessary, including the steps such as breaking or grounding).

As demanded, the support can be prepared into a variety of easily operable shaped bodies, e.g. in forms of sphere, honeycomb, bird-nest, tablet or strip (trefoil, papilionaceous, cylindrical, and the like). The method of mixing the pseudoboehmite-containing hydrated alumina P1 and the P1's modifier P2 is a conventional method, e.g. a method that comprises adding P1 and P2 powders in a certain charging proportion into a stirring mixer to mix.

The method of introducing a boron-containing compound into the mixture of P1 and P2 is a conventional method. For example, in a specific embodiment for preparing the support, the method of introducing the boron-containing compound to the mixture of the pseudoboehmite-containing hydrated alumina P1 and the P1's modifier P2 comprise formulating the boron-containing compound into an aqueous solution; adding this solution into the mixture system of P1 and P2 when P1 and P2 are being mixed or after P1 and P2 have been mixed; and shaping, drying and calcining the mixture.

The boron-containing compound can be any water-soluble boron-containing compound or a mixture thereof; for example, boric acid, sodium borate, or a mixture thereof.

The shaping can be conducted conventionally. Upon shaping, e.g. shaping by extrusion into strips, in order to make the shaping smooth, it is possible to add water, an extrusion aid and/or a binder, and optionally a pore-expander to the mixture, and then the mixture is shaped by extrusion, and then dried and calcined. The kinds and the amounts of the extrusion aid and the binder are well known by the skilled person in the art. For example, the common extrusion aid can be one or more of sesbania powder, methyl cellulose, starch, polyvinyl alcohol, polyethylene glycol. The binder can be an inorganic acid and/or an organic acid. The pore-expander can be one or more of starch, synthesized cellulose, polymeric alcohol and surfactant. The synthesized cellulose preferably is methylol cellulose, methyl cellulose, ethyl cellulose, carboxymethyl cellulose and carboxyethyl cellulose. The polymeric alcohol preferably is one or more of polyethylene glycol, polypropylene glycol, and polyvinyl alcohol. The surfactant preferably is one or more of fatty alcohol polyoxyethylene ether, fatty alcohol amide and a derivative thereof; an allyl alcohol copolymer (e.g. having a MW of 200-10000) and a cis-pentenoic acid copolymer.

Loading the Hydrogenation Active Metal Element on the Support

As a prerequisite to ensure that the hydrogenation active metal element can be loaded on the support, there is not any specific limitation to the method of loading the hydrogenation active metal element. The preferable method is an impregnation method, which includes formulating an impregnation solution with a compound containing the metal, impregnating the support with the impregnation solution, drying, and optionally calcining. The impregnating can be a conventional method, for example, an excessive impregnation method or a pore saturation impregnation method. For example, the support can be impregnated with a solution containing an excessive amount of a compound having the metal element in the group VIII of the Periodic Table and/or a compound having the metal element in the group VIB of the Periodic Table, or can be impregnated by pore saturation with a solution containing a compound having the metal element in the group VIII of the Periodic Table and/or a compound having the metal element in the group VIB of the Periodic. Table, then dried, and optionally calcined.

In an embodiment, calculated as oxide and based on the hydrogenation demetalling catalyst II, said impregnation is conduced in such a manner that, in the final catalyst, the content of the metal element in the group VIII of the Periodic Table is from more than zero to no more than 3 wt %, the content of the metal element in the group VIB of the Periodic Table is from more than zero to no more than 15 wt %.

In an embodiment, calculated as oxide and based on the hydrogenation demetalling catalyst II, said impregnation is conduced in such a manner that, in the final catalyst, the content of the metal element in the group VIII of the Periodic Table is from more than 0.8 to no more than 3 wt %, the content of the metal element in the group VIB of the Periodic Table is from more than 3 to no more than 10 wt %.

In an embodiment, calculated as oxide and based on the hydrogenation demetalling catalyst II, said impregnation is conduced in such a manner that, in the final catalyst, the content of the metal element in the group VIII of the Periodic Table is from more than 1 to no more than 2 wt %, the content of the metal element in the group VIB of the Periodic Table is from more than 4 to no more than 8 wt %.

In an embodiment, calculated as oxide and based on the hydrogenation demetalling catalyst II, said impregnation is conduced in such a manner that, in the final catalyst, the content of the metal element in the group VIII of the Periodic Table is from more than zero to no more than 0.8 wt %, the content of the metal element in the group VIB of the Periodic Table is from more than zero to no more than 4 wt %.

In an embodiment, calculated as oxide and based on the hydrogenation demetalling catalyst II, said impregnation is conduced in such a manner that, in the final catalyst, the content of the metal element in the group VIII of the Periodic Table is from more than 0.1 to no more than 0.6 wt %, the content of the metal element in the group VIB of the Periodic Table is from more than 1.5 to no more than 3.5 wt %.

The drying and the calcining are conventional methods. Preferably, the drying is conducted at 100250° C. and/or for 1-10 hrs. More preferably, the drying is conducted at 100-140° C. and/or for 1-6 hrs. Preferably, the calcining is conducted at 360-500° C. and/or for 1-10 hrs. More preferably, the calcining is conducted at 360-450 and/or for 2-6 hrs.

The compound having the metal element in the group VIB of the Periodic Table can be at least one soluble compound having the metal element in the group VIB of the Periodic Table, such as one or more of molybdenum oxide, a molybdate and a paramolybdate, preferably one or more of molybdenum oxide, ammonium molybdate and ammonium paramolybdate; and/or such as one or more of a tungstate, a metatungstate and an ethyl metatungstate, preferably one or more of ammonium metawolframate and ethyl ammonium metawolframate.

The compound having the metal element in the group VIB of the Periodic Table can be at least one soluble compound having the metal element in the group VIB of the Periodic Table, such as one or more of molybdenum oxide, a molybdate and a paramolybdate, preferably one or more of molybdenum oxide, ammonium molybdate and ammonium paramolybdate; and/or such as one or more of a tungstate, a metatungstate and an ethyl metatungstate, preferably one or more of ammonium metawolframate and ethyl ammonium metawolframate.

The compound having the metal element in the group VIII of the Periodic Table can be at least one soluble compound having the metal element in the group VIII of the Periodic Table, such as one or more of cobalt nitrate, cobalt acetate, basic cobalt carbonate, cobalt chloride and a dissolvable cobalt-containing complex, preferably one or more of cobalt nitrate and basic cobalt carbonate; or such as one or more nickel nitrate, nickel acetate, basic nickel carbonate, nickel chloride and a dissolvable nickel-containing complex, preferably one or more of nickel nitrate and basic nickel carbonate.

Additional Elements

According to the present invention, the hydrogenation demetalling catalyst II can further contain any additional element which does not affect the catalytic performance of the catalyst or can improve the catalytic performance of the catalyst. For example, the catalyst can contain the additional element such as P, halogen, and alkaline earth metal.

For the halogen, based on the catalyst and calculated as halogen atom, the content of halogen is no more than 10 wt %, preferably 0.1-4 wt %. For other additional elements, calculated as oxide and based on the catalyst, the content of additional element is no more than 10 wt %, preferably 0.1-4 wt %.

In case that the catalyst further contains the additional element such as P, halogen, and alkaline earth metal, the introduction method of the additional element can be any possible method. For example, the compound having the additional element such as P, halogen and alkaline earth metal is directly mixed with the starting materials for preparing the support (such as the mixture of P1 and P2), and the mixture is shaped and calcined; or the compound having the additional element such as P, halogen and alkaline earth metal and the compound having the hydrogenation active metal element are formulated into a mixed solution, and the support is impregnated with this mixed solution; or the compound having the additional element such as P, halogen and alkaline earth metal is formulated alone into a solution, and the support is impregnated with this solution and calcined.

In case that the additional element such as P, halogen and alkaline earth metal and the hydrogenation active metal element are separately introduced into the support, it is preferable that the support is firstly impregnated with a solution containing the compound having the additional element such as P, halogen and alkaline earth metal and calcined, and then impregnated with a solution containing the compound having the hydrogenation active metal element.

The calcining is conducted at 400-600° C., preferably 420-500° C. and/or for 2-6 hrs, preferably 3-6 hrs.

Hydrogenation Treatment Catalyst III

According to the present invention, the hydrogenation treatment catalyst III (hereinafter, also called as the hydrogenation treatment catalyst CIII) has a function of treating the large molecule compounds such as saturated polycyclic aromatic hydrocarbons to remove the intractable impurities such as N and S, and also removing the residual carbon in raw oil to improve the product properties. As a prerequisite to ensure that the above function can be accomplished, according to the present invention, there is not any specific limitation to the hydrogenation treatment catalyst III. That is to say, the hydrogenation treatment catalyst III can be any one selected from the group consisting of the catalysts for hydrorefining and hydrotreating provided in the prior art. They can be a commercially available product, or can be produced with any technique known in the prior art.

In general, the catalyst of this kind contains a heat-resistant organic oxide support and a hydrogenation active metal element. For example, the catalyst III contains at least one support selected from the group consisting of alumina and/or silica-alumina, at least one hydrogenation active metal element selected from the group consisting of nickel, cobalt, molybdenum, tungsten and a combination thereof, optionally at least one auxiliary agent selected from the group consisting of fluorine, boron, phosphorus, and a combination thereof. Calculated as oxide and based on the catalyst III, the content of nickel and/or cobalt is 1-5 wt %, the content of molybdenum and/or tungsten is 10-35 wt %, and calculated as the element, the content of at least one auxiliary agent selected from the group consisting of fluorine, boron, phosphorus and a combination thereof is 0-9 wt %.

In one embodiment, the hydrogenation treatment catalyst III has the following composition: 1-5 wt % of nickel oxide, 12-35 wt % of tungsten oxide, 1-9 wt % of fluorine, and the balance of alumina.

In one embodiment, the support of the hydrogenation treatment catalyst III selected from the group consisting of alumina. The alumina support has a pore volume of no less than 0.35 mL/g, and the pore volume of the pores having a pore diameter of 40-100 angstroms comprises more than 80% of the total pore volume.

In one embodiment, the hydrogenation active metal element of the hydrogenation treatment catalyst III is selected from the group consisting of nickel, molybdenum and tungsten. Calculated as oxide and based on the catalyst, the catalyst contains 0.5-10 wt % of molybdenum, 1-10 wt % of nickel, 12-35 wt % of tungsten and the balance of support.

For example, the Chinese patent application ZL97112397 discloses a hydrorefining catalyst, which comprises 1-5 wt % of nickel oxide, 12-35 wt % of tungsten oxide, 1-9 wt % of fluorine, and the balance of alumina. The alumina is compounded from at least one small pore alumina and at least one large pore alumina in a weight ratio of 75:25-50:50, wherein the small pore alumina is an alumina in which the pore volume of the pores having a pore diameter of less than 80 angstroms comprises no less than 95% of the total pore volume; and the large pore alumina is an alumina in which the pore volume of the pores having a pore diameter of 60-600 angstroms comprises no less than 70% of the total pore volume The Chinese patent application ZL00802168 discloses a hydrorefining catalyst, which comprises an alumina support and at least one metal element in the group VIB of the Periodic Table and/or at least one metal element in the group VIII of the Periodic Table loaded on the alumina support. The alumina support has a pore volume of no less than 035 mL/g. The pore volume of the pores having a pore diameter of 40-100 angstroms comprises no less than 80% of the total pore volume.

The Chinese patent application ZL200310117323 discloses a hydrorefining catalyst. The catalyst comprises an alumina support and molybdenum, nickel and tungsten loaded on the support. Calculated as oxide and based on the catalyst, the catalyst contains 0.5-10 wt % of molybdenum, 1-10 wt % of nickel, 12-35 wt % of tungsten and the balance of support. The catalyst is prepared by impregnating the alumina support successively with a solution containing a molybdenum-containing compound and a solution containing a nickel-containing compound and a tungsten-containing compound, wherein the alumina support is dried after being impregnated with the solution containing a molybdenum-containing compound, and dried and calcined after being impregnated with the solution containing a nickel-containing compound and a tungsten-containing compound, wherein the drying is conducted at 100-300° C. for 1-12 hrs, and the calcining is conducted at 320-500° C. for 1-10 hrs.

These catalysts can be used as the catalyst III of the present invention. The preparation methods for these catalysts are described in details in the above-mentioned patent literatures. All of these patent literatures are incorporated herein by reference.

Catalyst Combination

According to the present invention, there is provided a catalyst combination, which catalyst combination comprises
- one or both of at least one hydrogenation protection catalyst I and at least one hydrogenation demetalling catalyst I;
- at least one hydrogenation demetalling catalyst II; and
- at least one hydrogenation treatment catalyst III, wherein the content of the hydrogenation demetalling catalyst II in the catalyst combination, by volume and based on the total volume of the catalyst combination, is 5-50%, e.g. 10-40%, or 20-40%.

In one embodiment, the catalyst combination comprises the hydrogenation protection catalyst I having a bed voidage of 25-60%, preferably 30-50%.

In one embodiment, the catalyst combination comprises the hydrogenation protection catalyst I, the hydrogenation demetalling catalyst II and the hydrogenation treatment catalyst III, wherein by volume and based on the total volume of the catalyst combination, the content of the hydrogenation protection catalyst I is 5-60%, e.g. 10-50%, or 10-35%, the content of the hydrogenation demetalling catalyst II is 5-50%, e.g. 10-40%, or 20-40%, and the content of the hydrogenation treatment catalyst III is 10-60%, e.g. 20-50%, or 35-60%.

In one embodiment, the catalyst combination comprises the hydrogenation demetalling catalyst I, the hydrogenation demetalling catalyst II and the hydrogenation treatment catalyst III, wherein by volume and based on the total volume of the catalyst combination, the content of the hydrogenation demetalling catalyst I is 5-60%, e.g. 10-50%, or 10-35%, the content of the hydrogenation demetalling catalyst II is 5-50%, e.g. 10-40%, or 20-40%, and the content of the hydrogenation treatment catalyst III is 10-60%, e.g. 20-50%, or 35-60%.

In one embodiment, the catalyst combination comprises the hydrogenation protection catalyst I and/or the hydrogenation demetalling catalyst I, the hydrogenation demetalling catalyst II and the hydrogenation treatment catalyst III, wherein by volume and based on the total volume of the catalyst combination, the total content of the hydrogenation protection catalyst I and the hydrogenation demetalling catalyst I is 5-60%, e.g. 10-50%, or 10-35%, the content of the hydrogenation demetalling catalyst II is 5-50%, e.g. 10-40%, or 20-40%, and the content of the hydrogenation treatment catalyst III is 10-60%, e.g. 20-50%, or 35-60%.

According to the present invention, the catalyst combination can further comprise any other catalyst or filler that can improve the property of the catalyst combination, such as porcelain balls and active supporting substances.

According to the present invention, the catalyst combination can be used to treat a variety of raw oils, including but not limited to a crude oil containing the metal impurities such as nickel and vanadium, a vacuum residue, a deep-drawn wax oil, a light deasphalted oil, and a coker gas oil.

In a specific embodiment, the catalyst combination can be used to treat a heavy raw oil, and the heavy raw oil has one or more of the following properties: (1) asphaltine content>7 wt %; (2) Fe+Ca content>20 ppmw; (3) Ni+V content>80 ppmw; (4) sulfur content>3 wt %; and (5) residual carbon content>10 wt %.

In a specific embodiment, the catalyst combination can be used to treat a heavy raw oil, the heavy raw oil has the following properties: (1) asphaltine content>7 wt %; (2) Fe+Ca content>20 ppmw; (3) Ni+V content>80 ppmw; (4) sulfur content>3 wt %; and (5) residual carbon content>10 wt %.

In a specific embodiment, the catalyst combination can be used to treat a heavy raw oil, the heavy raw oil has the following properties: (1) Ni+V content>160 ppmw; (2) sulfur content>3 wt %; and (3) residual carbon content>10 wt %.

Hydrotreating Process

The present invention is also directed to a process of hydrotreating raw oil.

According to the hydrotreating process of the present invention, the hydrogenation demetalling catalyst I and/or the hydrogenation protection catalyst I, the hydrogenation demetalling catalyst II and the hydrogenation treatment catalyst III can be successively charged in the same reactor or in different reactors in series.

According to the present invention, there is not any specific limitation thereto.

According to the hydrotreating process of the present invention, in the order of the hydrogenation protection catalyst I and/or the hydrogenation demetalling catalyst I, the hydrogenation demetalling catalyst II, and the hydrogenation treatment catalyst III, the raw oil is contacted with the catalyst.

In one embodiment, the hydrotreating process is conducted under the following conditions: the hydrogen partial pressure is 6-20 MPa, the temperature is 300-450° C., the liquid-volume hourly space velocity is $0.1-1.0^{-1}$, and the hydrogen/oil volume ratio is 600-1500.

In another embodiment, the hydrotreating process is conducted under the following conditions: the hydrogen partial pressure is 10-18 MPa, the temperature is 350-420° C., the liquid-volume hourly space velocity is $0.2-0.6\ h^{-1}$, and the hydrogen/oil volume ratio is 750-1100.

According to the hydrotreating process of the present invention, the catalyst combination can be adjusted according to the properties of raw oil to be treated. For example, in case that the heavy raw oil has a high metal content, it is preferable to use a catalyst combination comprising the hydrogenation demetalling catalyst I, the hydrogenation demetalling catalyst II and the hydrogenation treatment catalyst III; and in case that the heavy raw oil has a high asphaltine content, it is preferable to use a catalyst combination comprising the hydrogenation protection catalyst I, the hydrogenation demetalling catalyst II and the hydrogenation treatment catalyst III.

According to the hydrotreating process of the present invention, by volume and based on the total volume of the catalyst combination, the content of the hydrogenation demetalling catalyst II is 5-50%, e.g. 10-40%, or 20-40%.

According to the hydrotreating process of the present invention, the hydrogenation protection catalyst I has a bed voidage of 25-60%, preferably 30-50%.

According to the hydrotreating process of the present invention, by volume and based on the total volume of the catalyst combination, the content of the hydrogenation protection catalyst I is 5-60%, e.g. 10-50%, or 10-35%, the content of the hydrogenation demetalling catalyst II is 5-50%, e.g. 10-40%, or 20-40%, and the content of the hydrogenation treatment catalyst III is 10-60%, e.g. 20-50%, or 35-60%.

According to the hydrotreating process of the present invention, by volume and based on the total volume of the catalyst combination, the content of the hydrogenation demetalling catalyst I is 5-60%, e.g. 10-50%, or 10-35%, the content of the hydrogenation demetalling catalyst II is 5-50%, e.g. 10-40%, or 20-40%, and the content of the hydrogenation treatment catalyst III is 10-60%, e.g. 20-50%, or 35-60%.

According to the hydrotreating process of the present invention, by volume and based on the total volume of the catalyst combination, the total content of the hydrogenation protection catalyst I and the hydrogenation demetalling catalyst I is 5-60%, e.g. 10-50%, or 10-35%, the content of the hydrogenation demetalling catalyst II is 5-50%, e.g. 10-40%, or 20-40%, and the content of the hydrogenation treatment catalyst III is 10-60%, e.g. 20-50%, or 35-60%.

According to the hydrotreating process of the present invention, there can be any other catalyst or filler that can improve the property of the catalyst combination before and/or after the catalyst combination and/or between any two catalysts of the catalyst combination. For example, there can be fillers such as porcelain balls and active supporting substances before the hydrogenation protection catalyst I so as to improve the distribution of raw oil in the reactor. The use of these fillers is well known by the skilled person in the art and therefore it is unnecessary herein to discuss it in detail.

According to the hydrotreating process of the present invention, raw oil is selected from the group consisting of a crude oil containing the metal impurities such as nickel and vanadium, a vacuum residue, a deep-drawn wax oil, a light deasphalted oil, a coker gas oil, and a combination thereof. In a specific embodiment, raw oil has one or more of the following properties: (1) asphaltine content>7 wt %; (2) Fe+Ca content>20 ppmw; (3) Ni+V content>80 ppmw; (4) sulfur content>3 wt %; and (5) residual carbon content>10 wt %. In a specific embodiment, raw oil has the following properties: (1) asphaltine content>7 wt %; (2) Fe+Ca content>20 ppmw; (3) Ni+V content>80 ppmw; (4) sulfur content>3 wt %; and (5) residual carbon content>10 wt %. In a specific embodiment, raw oil has the following properties: (1) Ni+V content>160 ppmw; (2) sulfur content>3 wt %; and (3) residual carbon content>10 wt %.

According to the hydrotreating process of the present invention, the hydrotreated oil has an asphaltine content of no more than 0.5%, a sulfur content of no more than 0.5%, and a residual carbon content of no more than 6.0%, and can be used as raw oil for the secondary treatment such as catalytic cracking.

EXAMPLES

Hereinafter, the present invention will be further illustrated by the Examples. It should be noted that the scope of the present invention will not be limited by these examples.

Example A

Hydrogenation Protection Catalyst CI

Preparation of the Support SI of the Hydrogenation Protection Catalyst CI

With the following procedures, the supports SIs of the hydrogenation protection catalyst CI as shown in Table A-1 were obtained.

Support SI-1: 1000 g of aluminum hydroxide powder and 100 g of titanium dioxide powder were mixed. The mixture was compressed in a die and shaped to honeycomb-like columns having a height of 10 mm, a diameter 40 mm and a wall thickness of 2 mm and containing 100 triangle pore channels. The shaped bodies were dried at 120° C. for 4 hrs and then calcined at 880° C. for 4 hrs to produce the support SI-1. The physical and chemical properties of the support SI-1 were shown in Table A-1.

Support SI-2: 200 g of aluminum hydroxide powder and 80 g of aluminium titanate powder were mixed. The mixture was compressed in a die and shaped to seven-pore spheres having an outer-diameter of 16 mm and containing pore channels with a diameter of 3 mm. The shaped bodies were dried at 80° C. for 3 hrs and then calcined at 950° C. for 2 hrs to produce the support SI-2. The physical and chemical properties of the support SI-2 were shown in Table A1.

Support SI-3: 200 g of boehmite powder and 18 g of titanium dioxide powder were mixed. The mixture was extruded on a twin-screw extruder into rasching rings having an outer diameter of 5.0 mm and a wall thickness of 1.5 mm. The shaped bodies were dried at 120° C. for 2 hrs and then calcined at 900° C. for 3 hrs to produce the support SI-3. The physical and chemical properties of the support SI-3 were shown in Table A-1.

Support SI-4: 1000 g of aluminum hydroxide powder and 40 g of titanium dioxide powder were mixed. The mixture was compressed in a die and shaped to honeycomb-like columns having a height of 10 mm, a diameter of 8.0 mm and a wall thickness of 1 mm, and containing 15 irregular pore channels. The shaped bodies were dried at 100° C. for 4 hrs and then calcined at 980° C. for 2 hrs to produce the support SI-4. The physical and chemical properties of the support SI-4 were shown in Table A-1.

Support SI-5: 40 g of titanium dioxide powder and 500 g of aluminum hydroxide were mixed. The mixture was extruded on a plunger extruder into hollow gear-like columns having an outer diameter of 4.5 mm and a wall thickness of 1.8 mm. The shaped bodies were dried at 90° C. for 4 hrs and then calcined at 960° C. for 2 hrs to produce the support SI-5. The physical and chemical properties of the support SI-5 were shown in Table A-1.

Support SI-6: a supporting porcelain ring (wherein the alumina content is 62 wt %, others are Si, Ca, Mg, K and the like) available from Jiang Su Yi Xing Porcelain Company. The physical and chemical properties of the support SI-6 were shown in Table A-1.

Support SI-7: 100 g of boehmite powder and 300 g of aluminum hydroxide powder were mixed. The mixture was extruded on a twin-screw extruder into rasching rings having an outer diameter of 5.0 mm and a wall thickness of 1.5 mm. The shaped bodies were dried at 120° C. for 2 hrs and then calcined at 900° C. for 3 hrs to produce the support SI-7. The physical and chemical properties of the support SI-7 were shown in Table A-1.

TABLE A-1

| | Support SI-1 | Support SI-2 | Support SI-3 | Support SI-4 | Support SI-5 | Support SI-6 | Support SI-7 |
|---|---|---|---|---|---|---|---|
| $Al_2O_3$, wt % | 87 | 83 | 91 | 93 | 90 | 62 | 100 |
| $TiO_2$, wt % | 13 | 17 | 9 | 7 | 10 | others are Si, Ca, Mg, K and the like | — |
| Bed Voidage, % | 53 | 48 | 49 | 45 | 48 | 50 | 49 |
| Crushing Strength, N/Particle | 80 | 120 | 80 | 90 | 140 | 90 | 16 |
| Pore Volume, mL/g | 0.62 | 0.48 | 0.60 | 0.68 | 0.72 | 0.05 | 0.58 |
| Specific Surface Area, $m^2/g$ | 105 | 80 | 90 | 110 | 130 | 5 | 95 |

The crushing strength was measured according to RIPP 25-90.

The support composition was obtained by calculation.

The pore volume and the specific surface area were measured by the BET method.

Preparation of the Hydrogenation Protection Catalyst CI

With the following procedures, the hydrogenation protection catalysts CIs as shown in Table A-2 were obtained.

Hydrogenation protection catalyst CI-1: 200 g of the support SI-2 was impregnated in 500 mL of a mixed solution of ammonium metawoiframate and nickel nitrate (having a tungsten content, calculated as WO3, of 70 g/L, and a nickel content, calculated as NiO, of 15 g/L) for 1 hr. After filtering, the impregnated support was dried at 100° C. for 4 hrs, and calcined at 450° C. for 4 hrs to produce the hydrogenation protection catalyst CI-1. The composition of the hydrogenation protection catalyst CI-1 was listed in Table A-2.

Hydrogenation protection catalyst CI-2: 200 g of the support SI-2 was impregnated in 500 mL of a mixed solution of ammonium molybdate and nickel nitrate (having a molybdenum content, calculated as MoO3, of 50 g/L, and a nickel content, calculated as NiO, of 8 g/L) for 1 hr. After filtering, the impregnated support was dried at 120° C. for 2 hrs, and calcined at 480° C. for 4 hrs to produce the hydrogenation protection catalyst CI-2. The composition of the hydrogenation protection catalyst CI-2 was listed in Table A-2.

Hydrogenation protection catalyst CI-3: 200 g of the support SI-3 was impregnated in 500 mL of a mixed solution of ammonium molybdate and nickel nitrate (having a molybdenum content, calculated as MoO3, of 80 g/L, and a nickel content, calculated as NiO, of 20 g/L) for 1 hr. After filtering, the impregnated support was dried at 120° C. for 2 hrs, and calcined at 500° C. for 4 hrs to produce the hydrogenation protection catalyst CI-3. The composition of the hydrogenation protection catalyst CI-3 was listed in Table A-2.

Hydrogenation protection catalyst CI-4: 200 g of the support SI-5 was impregnated in 500 mL of a mixed solution of ammonium molybdate and cobalt nitrate (having a molybdenum content, calculated as MoO3, of 40 g/L, and a cobalt content, calculated as CoO, of 12 g/L) for 1 hr. After filtering, the impregnated support was dried at 90° C. for 4 hrs, and calcined at 480° C. for 4 hrs to produce the hydrogenation protection catalyst CI-4. The composition of the hydrogenation protection catalyst CI-4 was listed in Table A-2.

Hydrogenation protection catalyst CI-5: 200 g of the support SI-6 was impregnated in 500 mL of a mixed solution of ammonium molybdate and nickel nitrate (having a molybdenum content, calculated as MoO3, of 70 g/L, and a nickel content, calculated as NiO, of 10 g/L) for 1 hr. After filtering, the impregnated support was dried at 120° C. for 2 hrs, and calcined at 480° C. for 4 hrs to produce the hydrogenation protection catalyst CI-5. The composition of the hydrogenation protection catalyst CI-5 was listed in Table A-2.

Hydrogenation protection catalyst CI-6: 200 g of the support SI-7 was impregnated in 500 mL of a mixed solution of ammonium molybdate and nickel nitrate (having a molybdenum content, calculated as MoO3, of 50 g/L, and a nickel content, calculated as NiO, of 8 g/L) for 1 hr. After filtering, the impregnated support was dried at 120° C. for 2 hrs, and calcined at 480° C. for 4 hrs to produce the hydrogenation protection catalyst CI-6. The composition of the hydrogenation protection catalyst CI-6 was listed in Table A-2.

TABLE A-2

| Support | Hydrogenation Protection Catalyst | Metal Oxide Content, wt % | | | |
|---|---|---|---|---|---|
| | | MoO3 | WO3 | NiO | CoO |
| Support SI-2 | CI-1 | — | 6.8 | 1.2 | — |
| Support SI-2 | CI-2 | 4.5 | — | 1.0 | — |
| Support SI-3 | CI-3 | 7.5 | — | 2.0 | — |
| Support SI-5 | CI-4 | 4.0 | — | — | 1.1 |
| Support SI-6 | CI-5 | 4.5 | — | 1.0 | — |
| Support SI-7 | CI-6 | 4.5 | — | 1.0 | — |

The contents of active metal components in the catalyst were measured according to RIPP 133-90.

Hydrogenation Demetalling Catalyst CII

Preparation of the Support SII of the Hydrogenation Demetalling Catalyst CII

In this example, the following pseudoboehmite-containing hydrated aluminas P1s were used:

Hydrated alumina P1-1: A dried pseudoboehmite powder produced by Sinopec Changling Catalyst Division (having a pore volume of 1.2 mL/g, a specific surface area of 280 $m^2/g$, a most probable pore diameter of 15.8 nm, a dry basis weight percent of 73 wt %, wherein the content of pseudoboehmite was 68 wt %, the content of gibbsite was 5 wt %, and the balance was amorphous alumina, and a DI value of 15.8).

Hydrated alumina P1-2: A dried pseudoboehmite powder produced by Yantai Henghui Chemical Industry Co., Ltd (having a pore volume of 1.1 mL/g, a specific surface area of 260 m²/g, a most probable pore diameter of 12 nm, a dry basis weight percent of 71 wt %, wherein the content of pseudoboehmite was 67 wt %, the content of gibbsite was wt %, and the balance was amorphous alumina, and a DI value of 17.2).

In this example, the hydrated aluminas P1s were modified to produce the following modifiers P2s:

Modifier P2A: 1000 g of the hydrated alumina P1-1 was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter $\phi$ of 1.4 mm. The resulting wet strips were dried at 120° C. for 4 hrs to produce dried strips. The resulting dried strips were reshaped and sieved. The sieved strips having a length of less than 2 mm were ground and sieved. The sieved fractions having 100-200 meshes were taken as the modifier P2A of the hydrated alumina P1-1. The modifier P2A had a κ value of 0.5.

Modifier P2B: 1000 g of the hydrated alumina P1-1 was flash-dried at 240° C. for 6 mins to produce the modifier P2B of the hydrated alumina P1-1. The modifier P2B had a κ value of 0.4.

Modifier P2C: the modifier P2A obtained in Example A and the modifier P2B obtained in Example A, each of which were in amounts of 200 g, were mixed evenly to produce the modifier P2C of the hydrated alumina P1-1. The modifier P2C had a κ value of 0.4.

Modifier P2D: 1000 g of the hydrated alumina P1-2 was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter $\phi$ of 1.4 mm. The resulting wet strips were dried at 120° C. for 4 hrs and calcined at 1200° C. for 4 hrs to produce the support strips. The resulting strips were reshaped and sieved. The sieved strips having a length of less than 2 mm were ground and sieved. The sieved fractions having 100-200 meshes were taken as the modifier P2D of the hydrated alumina P1-2. The modifier P2D had a κ value of 0.

Modifier P2E: 1000 g of the hydrated alumina P1-2 was flash-dried at 650° C. for 10 mins to produce the modifier P2E of the hydrated alumina P1-2. The modifier P2E had a κ value of 0.3.

With the following procedures, the supports SIIs and the comparative supports CSIIs of the hydrogenation demetalling catalyst CII as shown in Table A-3 were obtained.

Support SII-1: 800 g of the hydrated alumina P1-1 and 200 g of the modifier P2A produced in Example A as starting materials were mixed evenly. The mixture was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter $\phi$ of 1.4 mm. The resulting wet strips were dried at 120° C. for 4 hrs to produce shaped bodies. The shaped bodies were calcined at 900° C. for 3 hrs to produce the support SII-1. The properties of the support SII-1 were listed in Table A-3.

Support SII-2: 200 g of the hydrated alumina P1-1 and 800 g of the modifier P2B produced in Example A as starting materials were mixed evenly. The mixture was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter $\phi$ of 1.4 mm. The resulting wet strips were dried at 120° C. for 4 hrs to produce shaped bodies. The shaped bodies were calcined at 900° C. for 3 hrs to produce the support SII-2. The properties of the support SII-2 were listed in Table A-3.

Support SII-3: 500 g of the hydrated alumina P1-1 and 500 g of the modifier P2C produced in Example A as starting materials were mixed evenly. The mixture was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter $\phi$ of 1.4 mm. The resulting wet strips were dried at 120° C. for 4 hrs to produce shaped bodies. The shaped bodies were calcined at 950° C. for 3 hrs to produce the support SII-3. The properties of the support SII-3 were listed in Table A-3.

Support SII-4: 800 g of the hydrated alumina P1-2 and 200 g of the modifier P2D produced in Example A as starting materials were mixed evenly. The mixture was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter $\phi$ of 1.4 mm. The resulting wet strips were dried at 120° C. for 4 hrs to produce shaped bodies. The shaped bodies were calcined at 1000° C. for 3 hrs to produce the support SII-4. The properties of the support SII-4 were listed in Table A-3.

Support SII-5: 900 g of the hydrated alumina P1-1 and 100 g of the modifier P2E produced in Example A as starting materials were mixed evenly. The mixture was added to 1.440 mL of an aqueous solution containing 10 mL of nitric acid (a product available from Tianjin No. 3 Chemical Reagent Factory). The mixture was extruded on a twin-screw extruder into papilionaceous strips having an outer diameter $\phi$ of 1.4 mm. The resulting wet strips were dried at 120° C. for 4 hrs to produce shaped bodies. The shaped bodies were calcined at 1000° C. for 3 hrs to produce the support SII-5. The properties of the support SII-5 were listed in Table A-3.

Support SII-6: 850 g of the hydrated alumina P1-2 and 150 g of the modifier P2C produced in Example A as starting materials were mixed evenly. The mixture was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter $\phi$ of 1.4 mm. The resulting wet strips were dried at 120° C. for 4 hrs to produce shaped bodies. The shaped bodies were calcined at 850° C. for 3 hrs to produce the support SII-6. The properties of the support SII-6 were listed in Table A-3.

Support SII-7: 900 g of the hydrated alumina P1-2 and 100 g of the modifier P2D produced in Example A as starting materials were mixed evenly. The mixture was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter $\phi$ of 1.4 mm. The resulting wet strips were dried at 120° C. for 4 hrs to produce shaped bodies. The shaped bodies were calcined at 1000° C. for 3 hrs to produce the support SII-7. The properties of the support SII-7 were listed in Table A-3.

Support SII-8: 850 g of the hydrated alumina P1-2 and 150 g of the modifier P2E produced in Example A as starting materials were mixed evenly. The mixture was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter ϕ of 1.4 mm. The resulting wet strips were dried at 120° C. for 4 hrs to produce shaped bodies. The shaped bodies were calcined at 900° C. for 3 hrs to produce the support SII-8. The properties of the support SII-8 were listed in Table A-3.

Comparative support CSII-1: 1000 g of the hydrated alumina P1-1 was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter ϕ of 1.4 mm. The resulting wet strips were dried at 120° C. for 4 hrs to produce shaped bodies. The shaped bodies were calcined at 900° C. for 3 hrs to produce the comparative support CSII-1. The properties of the comparative support CSII-1 were listed in Table A-3.

Comparative support CSII-2: 1000 g of the hydrated alumina P1-2 was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter ϕ of 1.4 mm. The resulting wet strips were dried at 120° C. for 4 hrs to produce shaped bodies. The shaped bodies were calcined at 1000° C. for 3 hrs to produce the comparative support CSII-2. The properties of the comparative support CSII-2 were listed in Table A-3.

Comparative support CSII-3: According to the procedure provided in Example 9 of CN1782031A, the mixture was extruded on a twin-screw extruder into papilionaceous strips having an outer diameter ϕ of 1.4 mm. The resulting wet strips were dried at 120° C. for 4 hrs to produce shaped bodies. The shaped bodies were calcined at 900° C. for 3 hrs to produce the comparative support CSII-3. The properties of the comparative support CSII-3 were listed in Table A-3.

TABLE A-3

| Support | Specific surface area/ (m2/g) | Pore volume measured by mercury porosimetry/ (mL/g) | Percent of the 10 nm-30 nm pore volume relative to the total pore volume/% | Percent of the 300 nm-500 nm pore volume relative to the total pore volume/% |
|---|---|---|---|---|
| Support SII-1 | 178 | 1.06 | 66 | 26 |
| Support SII-2 | 150 | 1.14 | 60 | 30 |
| Support SII-3 | 145 | 1.13 | 61 | 28 |
| Support SII-4 | 130 | 1.15 | 65 | 30 |
| Support SII-5 | 142 | 1.09 | 64 | 25 |
| Support SII-6 | 172 | 1.07 | 65 | 19 |
| Support SII-7 | 135 | 1.09 | 62 | 24 |
| Support SII-8 | 161 | 1.00 | 61 | 18 |
| Comparative Support CSII-1 | 228 | 0.85 | 80 | 0 |
| Comparative Support CSII-2 | 230 | 0.88 | 81 | 0 |
| Comparative Support CSII-3 | 165 | 1.08 | 42.3 | 10.2 |

Preparation of the Hydrogenation Demetalling Catalyst CII

With the following procedures, the hydrogenation demetalling catalysts CDs and the comparative hydrogenation demetalling catalysts CCIIs as shown in Table A-4 were obtained.

Hydrogenation demeaning catalyst CII-1: 200 g of the support SII-1 was impregnated in 210 mL of a mixed solution of molybdenum oxide and basic cobalt carbonate (having a molybdenum content, calculated as MoO3, 67.9 g/l and a cobalt content, calculated as CoO, of 11.3 g/L) for 1 hr. The impregnated support was dried at 120° C. for 2 hrs and calcined at 420° C. for 3 hrs to produce the hydrogenation demetalling catalyst CII-1. The molybdenum content and the cobalt content of the hydrogenation demetalling catalyst CII-1 (calculated as MoO3 and CoO respectively) were listed in Table A-4.

Hydrogenation demetalling catalyst CII-2: 200 g of the support SII-2 was impregnated in 200 mL of a mixed solution of molybdenum oxide and basic nickel carbonate (having a molybdenum content, calculated as MoO3, of 53.1 g/L and a nickel content, calculated as NiO, of 10.6 g/L) for 1 hr. The impregnated support was dried at 120° C. for 2 hrs and calcined at 420° C. for 3 hrs to produce the hydrogenation demetalling catalyst CII-2. The molybdenum content and the nickel content of the hydrogenation demetalling catalyst CII-2 (calculated as MoO3 and NiO respectively) were listed in Table A-4.

Hydrogenation demetalling catalyst CII-3: 200 g of the support SII-3 was impregnated in 205 mL of a mixed solution of ammonium molybdate and nickel nitrate (having a molybdenum content, calculated as MoO3, of 78.5 g/L, and a nickel content, calculated as NiO, of 15.7 g/L) for 1 hr. The impregnated support was dried at 120° C. for 2 hrs and calcined at 420° C. for 3 hrs to produce the hydrogenation demetalling catalyst CII-3. The molybdenum content and the nickel content of the hydrogenation demetalling catalyst CII-3 (calculated as MoO3 and NiO respectively) were listed in Table A-4.

Hydrogenation demetalling catalyst CII-4: 200 g of the support SII-4 was impregnated in 210 mL of a mixed solution of molybdenum oxide and basic nickel carbonate (having a molybdenum content, calculated as MoO3, of 67.9 g/L, and a nickel content, calculated as NiO, of 11.3 g/L) for 1 hr. The impregnated support was dried at 120° C. for 2 hrs and calcined at 420° C. for 3 hrs to produce the hydrogenation demetalling catalyst CII-4. The molybdenum content and the nickel content of the hydrogenation demetalling catalyst CII-4 (calculated as MoO3 and NiO respectively) were listed in Table A-4.

Hydrogenation demetalling catalyst CII-5: 200 g of the support SII-8 was impregnated in 200 mL of a mixed solution of molybdenum oxide and basic cobalt carbonate (having a molybdenum content, calculated as MoO3, of 82.8 g/L, and a cobalt content, calculated as CoO, of 19.1 g/L) for 1 hr. The impregnated support was dried at 120° C. for 2 hrs and calcined at 420° C. for 3 hrs to produce the hydrogenation demetalling catalyst CII-5. The molybdenum content and the cobalt content of the hydrogenation demetalling catalyst CII-5 (calculated as MoO3 and CoO respectively) were listed in Table A-4.

Comparative hydrogenation demetalling catalyst CCII-1: 200 g of the comparative support CSII-1 was impregnated in 180 mL of a mixed solution of molybdenum oxide and basic cobalt carbonate (having a molybdenum content, calculated as MoO3, of 79.2 g/L, and a cobalt content, calculated as CoO, of 13.2 g/L) for 1 hr. The impregnated support was dried at 120° C. for 2 hrs and calcined at 420° C. for 3 hrs to produce the comparative catalyst CCII-1. The molybdenum content and the cobalt content of the comparative catalyst CCII-1 (calculated as MoO3 and CoO respectively) were listed in Table A-4.

Comparative hydrogenation demetalling catalyst CCII-2: 200 g of the comparative support CSII-1 was impregnated in 180 mL of a mixed solution of molybdenum oxide and basic nickel carbonate (having a molybdenum content, calculated as MoO3, of 59.0 g/L, and a nickel content, calculated as NiO, of 11.8 g/L) for 1 hr. The impregnated support was dried at 120° C. for 2 hrs and calcined at 420° C. for 3 hrs to produce the comparative catalyst CCII-2. The molybdenum content and the nickel content of the comparative catalyst CCII-2 (calculated as MoO3 and NiO respectively) were listed in Table A4.

Comparative hydrogenation demetalling catalyst CCII-3: 200 g of the comparative support CSII-2 was impregnated in 180 mL of a mixed solution of molybdenum oxide and basic nickel carbonate (having a molybdenum content, calculated as MoO3, of 87.2 g/l and a nickel content, calculated as NiO, of 17.4 g/L) for 1 hr. The impregnated support was dried at 120° C. for 2 hrs and calcined at 420° C. for 3 hrs to produce the comparative catalyst CCII-3. The molybdenum content and the nickel content of the comparative catalyst CCII-3 (calculated as MoO3 and NiO respectively) were listed in Table A-4.

Comparative hydrogenation demetalling catalyst CCII-4: 200 g of the comparative support CSII-3 was impregnated in 200 mL of a mixed solution of molybdenum oxide and basic cobalt carbonate (having a molybdenum content, calculated as MoO3, of 82.8 g/L, and a cobalt content, calculated as CoO, of 19.1 g/l) for 1 hr. The impregnated support was dried at 120° C. for 2 hrs and calcined at 420° C. thr 3 hrs to produce the comparative catalyst CCII-4. The molybdenum content and the cobalt content of the comparative catalyst CCII-4 (calculated as MoO3 and CoO respectively) were listed in Table A-4.

TABLE A-4

| Catalyst | Support | Metal oxide content (wt %) | | |
|---|---|---|---|---|
| | | MoO3 | NiO | CoO |
| CII-1 | support SII-1 | 6.6 | | 1.1 |
| CII-2 | support SII-2 | 5.0 | 1.0 | |
| CII-3 | support SII-3 | 7.3 | 1.5 | |
| CII-4 | support SII-4 | 6.6 | | 1.1 |
| CII-5 | support SII-8 | 7.8 | | 1.8 |
| CCII-1 | comparative support CSII-1 | 6.6 | | 1.1 |
| CCII-2 | comparative support CSII-1 | 5.0 | 1.0 | |
| CCII-3 | comparative support CSII-2 | 7.3 | 1.5 | |
| CCII-4 | comparative support CSII-3 | 7.8 | | 1.8 |

Hydrogenation Treatment Catalyst CIII

Hydrogenation treatment catalyst CIII-1: the hydrogenation treatment catalyst CIII-1 was prepared according to the method disclosed in the Chinese application ZL97112397, and contained 3 wt % of nickel (calculated as NiO), 25 wt % of tungsten (calculated as WO3), 2 wt % of fluorine (calculated as F), and the balance of alumina.

Hydrogenation treatment catalyst CIII-2: the hydrogenation treatment catalyst CIII-2 was prepared according to the method disclosed in the Chinese application ZL97112397, and contained 4 wt % of nickel (calculated as NiO), 30 wt % of tungsten (calculated as WO3), 2 wt % of fluorine (calculated as F), and the balance of alumina.

Hydrogenation treatment catalyst CIII-3: the hydrogenation treatment catalyst CIII-3 was prepared according to the method disclosed in the Chinese application ZL00802168, and contained 3.5 wt % of nickel (calculated as NiO), 18 wt % of molybdenum (calculated as MoO3), and the balance of alumina.

The effects of hydrogenating the heavy residual oil with the combinations of the above catalysts were illustrated by the following examples.

A mixed residual oil having an asphaltine content of 7.8 wt %, a Fe+Ca content of 26 ppmw, a Ni+V content of 90 ppmw, a sulfur content of 3.9 wt %, and a residual carbon content of 13 wt % was used as raw oil A. The performances of the combinations of the above catalysts were evaluated with a 500 mL fixed bed reactor.

The contents of Fe, Ca, Ni and V in the oil sample were measured according to RIPP 124-90.

The asphaltine content in the oil sample was measured according to RIPP 10-90.

The sulfur content in the oil sample was measured according to RIPP 62-90.

The content of the residual carbon in the oil sample was measured according to RIPP 149-90.

Example A-1

The above raw oil A was hydrogenated with the catalyst combination of the hydrogenation protection catalyst CI-1, the hydrogenation demetalling catalyst CII-1 and the hydrogenation treatment catalyst CIII-1.

In this catalyst combination, the charging volume ratio of three catalysts in the reactor and the operation conditions were listed in Table A-5. After a 1000-hour operation, a sample was taken from the reactor and analyzed. The product properties were also listed in Table A-5.

Example A-2

The above raw oil A was hydrogenated with the catalyst combination of the hydrogenation protection catalyst CI-2, the hydrogenation demetalling catalyst CII-2 and the hydrogenation treatment catalyst CIII-2.

In this catalyst combination, the charging volume ratio of three catalysts in the reactor and the operation conditions were listed in Table A-5. After a 1000-hour operation, a sample was taken from the reactor and analyzed. The product properties were also listed in Table A-5.

Example A-3

The above raw oil A was hydrogenated with the catalyst combination of the hydrogenation protection catalyst CI-3, the hydrogenation demetalling catalyst CII-3 and the hydrogenation treatment catalyst CII-3.

In this catalyst combination, the charging volume ratio of three catalysts in the reactor and the operation conditions were listed in Table A-5. After a 1000-hour operation, a sample was taken from the reactor and analyzed. The product properties were also listed in Table A-5.

Example A-4

The above raw oil A was hydrogenated with the catalyst combination of the hydrogenation protection catalyst CI-5, the hydrogenation demetalling catalyst CII-4 and the hydrogenation treatment catalyst CIII-3.

In this catalyst combination, the charging volume ratio of three catalysts in the reactor and the operation conditions were listed in Table A-5. After a 1000-hour operation, a sample was taken from the reactor and analyzed. The product properties were also listed in Table A-5.

Example A-C1

The above raw oil A was hydrogenated with the catalyst combination of the hydrogenation protection catalyst CI-2, the comparative hydrogenation demetalling catalyst CCII-2 and the hydrogenation treatment catalyst CIII-2.

In this catalyst combination, the charging volume ratio of three catalysts in the reactor and the operation conditions were listed in Table A-5. After a 1000-hour operation, a sample was taken from the reactor and analyzed. The product properties were also listed in Table A-5.

Example A-C2

The above raw oil A was hydrogenated with the catalyst combination of the hydrogenation protection catalyst CI-3, the comparative hydrogenation demetalling catalyst CCII-3 and the hydrogenation treatment catalyst CIII-3.

In this catalyst combination, the charging volume ratio of three catalysts in the reactor and the operation conditions were listed in Table A-5. After a 1000-hour operation, a sample was taken from the reactor and analyzed. The product properties were also listed in Table A-5.

Example A-C3

The above raw oil A was hydrogenated with the catalyst combination of the hydrogenation protection catalyst CI-6, the comparative hydrogenation demetalling catalyst CCII-4 and the hydrogenation treatment catalyst CIII-1.

In this catalyst combination, the charging volume ratio of three catalysts in the reactor and the operation conditions were listed in Table A-5. After a 1000-hour operation, a sample was taken from the reactor and analyzed. The product properties were also listed in Table A-5.

Example B

Hydrogenation Protection Catalyst CI

Preparation of the Support SI of the Hydrogenation Protection Catalyst CI

With the following procedures, the supports SIs of the hydrogenation protection catalyst CI as shown in Table B-1 were obtained.

Support SI-1: 1000 g of aluminum hydroxide powder and 100 g of titanium dioxide powder were mixed. The mixture was compressed in a die and shaped to honeycomb-like columns having a height of 10 mm, a diameter of 40 mm and a wall thickness of 2 min and containing 100 triangle pore channels. The shaped bodies were dried at 120° C. for 4 hrs and then calcined at 880° C. for 4 hrs to produce the support SI-1. The physical and chemical properties of the support SI-1 were shown in Table B-1.

Support SI-2: 200 g of aluminum hydroxide powder and 80 g of aluminium titanate powder were mixed. The mixture was compressed in a die and shaped to seven-pore spheres having an outer-diameter of 16 mm and containing pore channels with a diameter of 3 mm. The shaped bodies were dried at 80° C. for 3 hrs and then calcined at 950° C. for 2 hrs to produce the support SI-2. The physical and chemical properties of the support SI-2 were shown in Table B-1.

Support SI-3: 200 g of boehmite powder and 18 g of titanium dioxide powder were mixed. The mixture was extruded on a twin-screw extruder into ranching rings having an outer diameter of 5.0 mm and a wall thickness of 1.5 mm. The shaped bodies were dried at 120° C. for 2 hrs and then calcined at 900° C. for 3 hrs to produce the support SI-3. The physical and chemical properties of the support SI-3 were shown in Table B-1.

Support SI-4: 1000 g of aluminum hydroxide powder and 40 g of titanium dioxide powder were mixed. The mixture was compressed in a die and shaped to honeycomb-like columns having a height of 10 mm, a diameter of 8.0 mm and a wall thickness of 1 mm, and containing 15 irregular pore channels. The shaped bodies were dried at 100° C. for 4 hrs and then calcined at 980° C. for 2 hrs to produce the support SI-4. The physical and chemical properties of the support SI-4 were shown in Table B-1.

Support SI-5: 40 g of titanium dioxide powder and 500 g of aluminum hydroxide were mixed. The mixture was

TABLE A-5

| | Example | | | | | | |
|---|---|---|---|---|---|---|---|
| | A-1 | A-2 | A-3 | A-4 | A-C1 | A-C2 | A-C3 |
| Hydrogenation protection catalyst CI, vol % | 10 | 15 | 20 | 15 | 15 | 20 | 15 |
| hydrogenation demetalling catalyst CII, vol % | 30 | 35 | 30 | 40 | 35 | 30 | 40 |
| hydrogenation treatment catalyst CIII, vol % | 60 | 50 | 50 | 45 | 50 | 50 | 45 |
| Hydrogen/oil volume ratio | 800 | 850 | 750 | 900 | 800 | 900 | 850 |
| Hydrogen partial pressure/MPa | 14.0 | 15.0 | 15.0 | 14.5 | 15.0 | 15.0 | 15.0 |
| Reaction Temperature/° C. | 375 | 380 | 385 | 380 | 380 | 385 | 385 |
| Space velocity/$h^{-1}$ | 0.25 | 0.3 | 0.3 | 0.2 | 0.3 | 0.2 | 0.25 |
| Product properties | | | | | | | |
| Asphaltine Content, wt % | 0.4 | 0.3 | 0.25 | 0.35 | 1.4 | 1.8 | 1.7 |
| Fe + Ca/$\mu g \cdot g^{-1}$ | 3 | 4 | 3 | 5 | 6 | 8 | 9 |
| Ni + V/$\mu g \cdot g^{-1}$ | 9 | 12 | 11 | 18 | 25 | 21 | 29 |
| Sulfur content, wt % | 0.37 | 0.40 | 0.45 | 0.54 | 0.53 | 0.51 | 0.52 |
| Residual carbon content, wt % | 5.1 | 5.0 | 5.7 | 5.9 | 6.3 | 6.5 | 6.7 | extruded on a plunger extruder into hollow gear-like columns having an outer diameter of 4.5 mm and a wall thickness of 1.8 mm. The shaped bodies were dried at 90° C. for 4 hrs and then calcined at 960° C. for 2 hrs to produce the support SI-5. The physical and chemical properties of the support SI-5 were shown in Table B-1.

Support SI-6: a supporting porcelain ring (wherein the alumina content is 62 wt %, others are Si, Ca, Mg, K and the like) available from Jiang Su Yi Xing Porcelain Company. The physical and chemical properties of the support SI-6 were shown in Table B-1.

Support SI-7: 100 g of boehmite powder and 300 g of aluminum hydroxide powder were mixed. The mixture was extruded on a twin-screw extruder into rasching rings having an outer diameter of 5.0 mm and a wall thickness of 1.5 mm. The shaped bodies were dried at 120° C. for 2 hrs and then calcined at 900° C. for 3 hrs to produce the support SI-7. The physical and chemical properties of the support SI-7 were shown in Table B-f.

TABLE B-1

| | Support | | | | | | |
|---|---|---|---|---|---|---|---|
| | Support SI-1 | Support SI-2 | Support SI-3 | Support SI-4 | Support SI-5 | Support SI-6 | Support SI-7 |
| $Al_2O_3$, wt % | 87 | 83 | 91 | 93 | 90 | 62 | 100 |
| $TiO_2$, wt % | 13 | 17 | 9 | 7 | 10 | others are Si, Ca, Mg, K and the like | — |
| Bed Voidage, % | 53 | 48 | 49 | 45 | 48 | 50 | 49 |
| Crushing Strength, N/Particle | 80 | 120 | 80 | 90 | 140 | 90 | 16 |
| Pore Volume, mL/g | 0.62 | 0.48 | 0.60 | 0.68 | 0.72 | 0.05 | 0.58 |
| Specific Surface Area, $m^2/g$ | 105 | 80 | 90 | 110 | 130 | 5 | 95 |

The crushing strength was measured according to RIPP 25-90.

The support composition was obtained by calculation.

The pore volume, and the specific surface area were measured by the BET method.

Preparation of the Hydrogenation Protection Catalyst CI

With the following procedures, the hydrogenation protection catalysts CIs as shown in Table B-2 were obtained.

Hydrogenation protection catalyst CI-1: 200 g of the support SI-2 was impregnated in 500 mL of a mixed solution of ammonium metawolframate and nickel nitrate (having a tungsten content, calculated as WO3, of 70 g/L, and a nickel content, calculated as NiO, of 15 g/L) for 1 hr. After filtering, the impregnated support was dried at 100° C. for 4 hrs, and calcined at 450° C. for 4 hrs to produce the hydrogenation protection catalyst CI-1. The composition of the hydrogenation protection catalyst CI-1 was listed in Table B-2.

Hydrogenation protection catalyst CI-2: 200 g of the support SI-2 was impregnated in 500 mL of a mixed solution of ammonium molybdate and nickel nitrate (having a molybdenum content, calculated as MoO3, of 50 g/L, and a nickel content, calculated as NiO, of 8 g/L) for 1 hr. After filtering, the impregnated support was dried at 120° C. for 2 bra, and calcined at 480° C. for 4 hrs to produce the hydrogenation protection catalyst CI-2. The composition of the hydrogenation protection catalyst CI-2 was listed in Table B-2.

Hydrogenation protection catalyst CI-3: 200 g of the support SI-3 was impregnated in 500 mL of a mixed solution of ammonium molybdate and nickel nitrate (having a molybdenum content, calculated as MoO3, of 80 g/L, and a nickel content, calculated as NiO, of 20 g/L) for 1 hr. After filtering, the impregnated support was dried at 120° C. for 2 hrs, and calcined at 500° C. for 4 hrs to produce the hydrogenation protection catalyst CI-3. The composition of the hydrogenation protection catalyst CI-3 was listed in Table B-2.

Hydrogenation protection catalyst CI-4: 200 g of the support SI-5 was impregnated in 500 mL of a mixed solution of ammonium molybdate and cobalt nitrate (having a molybdenum content, calculated as MoO3, of 40 g/L, and a cobalt content, calculated as CoO, of 12 g/L) for 1 hr. After filtering, the impregnated support was dried at 90° C. for 4 hrs, and calcined at 480° C. for 4 hrs to produce the hydrogenation protection catalyst CI-4. The composition of the hydrogenation protection catalyst CI-4 was listed in Table B-2.

Hydrogenation protection catalyst CI-5: 200 g of the support SI-6 was impregnated in 500 mL of a mixed solution of ammonium molybdate and nickel nitrate (having a molybdenum content, calculated as MoO3, of 70 g/L, and a nickel content, calculated as NiO, of 10 g/L) for 1 hr. After filtering, the impregnated support was dried at 120° C. for 2 hrs, and calcined at 480° C. for 4 hrs to produce the hydrogenation protection catalyst CI-5. The composition of the hydrogenation protection catalyst CI-5 was listed in Table B-2.

Hydrogenation protection catalyst CI-6: 200 g of the support SI-7 was impregnated in 500 mL of a mixed solution of ammonium molybdate and nickel nitrate (having a molybdenum content, calculated as MoO3, of 50 g/L, and a nickel content, calculated as NiO, of 8 g/L) for 1 hr. After filtering, the impregnated support was dried at 120° C. for 2 hrs, and calcined at 480° C. for 4 hrs to produce the hydrogenation protection catalyst CI-6. The composition of the hydrogenation protection catalyst CI-6 was listed in Table 13-2.

TABLE B-2

| Support | Hydrogenation protection catalyst | Metal oxide content, wt % | | | |
|---|---|---|---|---|---|
| | | MoO3 | WO3 | NiO | CoO |
| Support SI-2 | CI-1 | — | 6.8 | 1.2 | — |
| Support SI-2 | CI-2 | 4.5 | — | 1.0 | — |
| Support SI-3 | CI-3 | 7.5 | — | 2.0 | — |
| Support SI-5 | CI-4 | 4.0 | — | — | 1.1 |
| Support SI-6 | CI-5 | 4.5 | — | 1.0 | — |
| Support SI-7 | CI-6 | 4.5 | — | 1.0 | — |

The contents of active metal components in the catalyst were measured according to RIPP 133-90.

Hydrogenation Demetalling Catalyst CII

Preparation of the Support SII of the Hydrogenation Demetalling Catalyst CII

In this example, the following pseudoboehmite-containing hydrated aluminas P1s were used:

Hydrated alumina P1-1: A dried pseudoboehmite powder produced by Sinopec Changling Catalyst Division (having a pore volume of 1.2 mL/g, a specific surface area of 280 m$^2$/g, a most probable pore diameter of 15.8 nm, a dry basis weight percent of 73 wt %, wherein the content of pseudoboehmite was 68 wt %, the content of gibbsite was 5 wt %, and the balance was amorphous alumina, and a DI value of 15.8). Hydrated alumina P1-2: A dried pseudoboehmite powder produced by Yantai Henghui Chemical Industry Co., Ltd (having a pore volume of 1.1 mL/g, a specific surface area of 260 m$^2$/g, a most probable pore diameter of 12 nm, a dry basis weight percent of 71 wt %, wherein the content of pseudoboehmite was 67 wt %, the content of gibbsite was 5 wt %, and the balance was amorphous alumina, and a DI value of 17.2).

In this example, the hydrated aluminas P1s were modified to produce the following modifiers P2s:

Modifier P2A: 1000 g of the hydrated alumina P1-1 was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter φ of 1.4 min. The resulting wet strips were dried at 120° C. for 4 hrs to produce dried strips. The resulting dried strips were reshaped and sieved. The sieved strips having a length of less than 2 min were ground and sieved. The sieved fractions having 100-200 meshes were taken as the modifier P2A of the hydrated alumina P1-1. The modifier P2A had a κ value of 0.5.

Modifier P2B: 1000 g of the hydrated alumina P1-1 was flash-dried at 240° C. for 6 mins to produce the modifier P2B of the hydrated alumina P1-1. The modifier P2B had a κ value of 0.4.

Modifier P2C: the modifier P2A obtained in Example B and the modifier P2B obtained in Example B, each of which were in amounts of 200 g, were mixed evenly to produce the modifier P2C of the hydrated alumina. P1-1. The modifier P2C had a κ value of 0.4.

Modifier P2D: 1000 g of the hydrated alumina P1-2 was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter φ of 1.4 mm. The resulting wet strips were dried at 120° C. for 4 hrs and calcined at 1200° C. for 4 hrs to produce the support strips. The resulting strips were reshaped and sieved. The sieved strips having a length of less than 2 mm were ground and sieved. The sieved fractions having 100-200 meshes were taken as the modifier P2D of the hydrated alumina P1-2. The modifier P2D had a κ value of 0.

Modifier P2E: 1000 g of the hydrated alumina P1-2 was flash-dried at 650° C. for 10 mins to produce the modifier P2E of the hydrated alumina P1-2. The modifier P2E had a κ value of 0.3.

With the following procedures, the supports SIIs and the comparative supports CSIIs of the hydrogenation demetalling catalyst CII as shown in Table B-3 were obtained.

Support SII-1: 800 g of the hydrated alumina P1-1 and 200 g of the modifier P2A produced in Example B as starting materials were mixed evenly. The mixture was added to 1440 mL of an aqueous solution containing 10 mL nitric acid (a product available from Tianjin No. 3 Chemical Reagent Factory) and 2.4 g boric acid (calculated as B2O3). The resulting mixture was extruded on a twin-screw extruder into papilionaceous strips having an outer diameter φ of 1.4 mm. The resulting wet strips were dried at 120° C. for 4 hrs to produce shaped bodies. The shaped bodies were calcined at 900° C. for 3 hrs to produce the support SII-1. The properties of the support SII-1 were listed in Table B-3.

Support SII-2: 200 g of the hydrated alumina P1-1 and 800 g of the modifier P2B produced in Example B as starting materials were mixed evenly. The mixture was added to 1440 mL of an aqueous solution containing 10 mL nitric acid (a product available from Tianjin No. 3 Chemical Reagent Factory) and 2.4 g boric acid (calculated as B2O3). The resulting mixture was extruded on a twin-screw extruder into papilionaceous strips having an outer diameter φ of 1.4 mm. The resulting wet strips were dried at 120° C. for 4 hrs to produce shaped bodies. The shaped bodies were calcined at 900° C. for 3 hrs to produce the support SII-2. The properties of the support SII-2 were listed in Table B-3.

Support SII-3: 500 g of the hydrated alumina P1-1 and 500 g of the modifier P2C produced in Example B as starting materials were mixed evenly. The mixture was added to 1440 mL of an aqueous solution containing 10 mL nitric acid (a product available from Tianjin No. 3 Chemical Reagent Factory) and 2.4 g boric acid (calculated as B2O3). The resulting mixture was extruded on a twin-screw extruder into papilionaceous strips having an outer diameter φ of 1.4 mm. The resulting wet strips were dried at 120° C. for 4 hrs to produce shaped bodies. The shaped bodies were calcined at 950° C. for 3 hrs to produce the support SII-3. The properties of the support SII-3 were listed in Table B-3.

Support SII-4: 800 g of the hydrated alumina P1-2 and 200 g of the modifier P2D produced in Example B as starting materials were mixed evenly. The mixture was added to 1440 mL of an aqueous solution containing 10 mL nitric acid (a product available from Tianjin No. 3 Chemical Reagent Factory) and 14 g boric acid (calculated as B2O3). The resulting mixture was extruded on a twin-screw extruder into papilionaceous strips having an outer diameter φ of 1.4 mm. The resulting wet strips were dried at 120° C. for 4 hrs to produce shaped bodies. The shaped bodies were calcined at 1000° C. for 3 hrs to produce the support SII-4. The properties of the support SII-4 were listed in Table B-3.

Support SII-5: 900 g of the hydrated alumina P1-1 and 100 g of the modifier P2E produced in Example B as starting materials were mixed evenly. The mixture was added to 1440 mL of an aqueous solution containing 10 mL nitric acid (a product available from Tianjin No. 3 Chemical Reagent Factory) and 14 g boric acid (calculated as B2O3). The resulting mixture was extruded on a twin-screw extruder into papilionaceous strips having an outer diameter φ of 1.4 mm. The resulting wet strips were dried at 120° C. for 4 hrs to produce shaped bodies. The shaped bodies were calcined at 1000° C. for 3 hrs to produce the support SII-5. The properties of the support SII-5 were listed in Table B-3.

Support SII-6: 850 g of the hydrated alumina P1-2 and 150 g of the modifier P2C produced in Example B as starting materials were mixed evenly. The mixture was added to 1440 mL of an aqueous solution containing 10 mL nitric acid (a product available from Tianjin No. 3 Chemical Reagent Factory) and 14 g boric acid (calculated as B2O3). The resulting mixture was extruded on a twin-screw extruder into papilionaceous strips having an outer diameter ϕ of 1.4 mm. The resulting wet strips were dried at 120° C. for 4 hrs to produce shaped bodies. The shaped bodies were calcined at 850° C. for 3 hrs to produce the support SII-6. The properties of the support SII-6 were listed in Table B-3.

Support SII-7: 900 g of the hydrated alumina P1-2 and 100 g of the modifier P2D produced in Example B as starting materials were mixed evenly. The mixture was added to 1440 mL of an aqueous solution containing 10 mL nitric acid (a product available from Tianjin No. 3 Chemical Reagent Factory) and 28 g boric acid (calculated as B2O3). The resulting mixture was extruded on a twin-screw extruder into papilionaceous strips having an outer diameter ϕ of 1.4 mm. The resulting wet strips were dried at 120° C. for 4 hrs to produce shaped bodies. The shaped bodies were calcined at 1000° C. for 3 hrs to produce the support SII-7. The properties of the support SII-7 were listed in Table B-3.

Support SII-8: 850 g of the hydrated alumina P1-2 and 150 g of the modifier P2E produced in Example B as starting materials were mixed evenly. The mixture was added to 1440 mL of an aqueous solution containing 10 mL nitric acid (a product available from Tianjin No. 3 Chemical Reagent Factory) and 28 g boric acid (calculated as B2O3). The resulting mixture was extruded on a twin-screw extruder into papilionaceous strips having an outer diameter ϕ of 1.4 mm. The resulting wet strips were dried at 120° C. for 4 hrs to produce shaped bodies. The shaped bodies were calcined at 900° C. for 3 hrs to produce the support SII-8. The properties of the support SII-8 were listed in Table B-3.

Comparative support CSII-1: 1000 g of the hydrated alumina P1-1 was added to 1440 mL of an aqueous solution containing 10 mL nitric acid (a product available from Tianjin No. 3 Chemical Reagent Factory) and 2.4 g boric acid (calculated as B2O3). The resulting mixture was extruded on a twin-screw extruder into papilionaceous strips having an outer diameter ϕ of 1.4 mm. The resulting wet strips were dried at 120° C. for 4 hrs to produce shaped bodies. The shaped bodies were calcined at 900° C. for 3 hrs to produce the comparative support CSII-1. The properties of the comparative support CSII-1 were listed in Table B-3.

Comparative support CSII-2: 1000 g of the hydrated alumina P1-2 was added to 1440 mL, of an aqueous solution containing 10 mL nitric acid (a product available from Tianjin No. 3 Chemical Reagent Factory) and 14 g boric acid (calculated as B2O3). The resulting mixture was extruded on a twin-screw extruder into papilionaceous strips having an outer diameter ϕ of 1.4 mm. The resulting wet strips were dried at 120° C. for 4 hrs to produce shaped bodies. The shaped bodies were calcined at 1000° C. for 3 hrs to produce the comparative support CSII-2. The properties of the comparative support CSII-2 were listed in Table B-3.

Comparative support CSII-3: According to the procedure provided in Example 9 of CN1782031A, the mixture was extruded on a twin-screw extruder into papilionaceous strips having an outer diameter ϕ of 1.4 mm. The resulting wet strips were dried at 120° C. for 4 hrs to produce shaped bodies. The shaped bodies were calcined at 900° C. for 3 hrs to produce the comparative support CSII-3. The properties of the comparative support CSII-3 were listed in Table B-3.

TABLE B-3

| Support | B2O3, wt % | Specific surface area/ (m2/g) | Pore volume measured by mercury porosimetry/ (mL/g) | Percent of the 10 nm-30 nm pore volume relative to the total pore volume/% | Percent of the 300 nm-500 nm pore volume relative to the total pore volume/% |
|---|---|---|---|---|---|
| Support SII-1 | 0.34 | 175 | 1.07 | 65 | 28 |
| Support SII-2 | 0.34 | 148 | 1.15 | 59 | 32 |
| Support SII-3 | 0.34 | 143 | 1.14 | 60 | 29 |
| Support SII-4 | 2.0 | 125 | 1.17 | 64 | 31 |
| Support SII-5 | 2.0 | 132 | 1.11 | 63 | 26 |
| Support SII-6 | 2.0 | 162 | 1.09 | 64 | 20 |
| Support SII-7 | 4.0 | 115 | 1.10 | 61 | 26 |
| Support SII-8 | 4.0 | 141 | 1.01 | 60 | 19 |
| Comparative Support CSII-1 | 0.34 | 218 | 0.87 | 78 | 0 |
| Comparative Support CSII-2 | 2.0 | 220 | 0.90 | 80 | 0 |
| Comparative Support CSII-3 | / | 165 | 1.08 | 42.3 | 10.2 |

Preparation of the Hydrogenation Demetalling Catalyst CII

With the following procedures, the hydrogenation demetalling catalysts CIIs and the comparative hydrogenation demetalling catalysts CCIIs as shown in Table B-4 were obtained.

Hydrogenation demetalling catalyst CII-1: 200 g of the support SII-1 was impregnated in 210 mL of a mixed solution of molybdenum oxide and basic cobalt carbonate (having a molybdenum content, calculated as MoO3, of 67.9 g/L, and a cobalt content, calculated as CoO, 11.3 g/L) for 1 hr. The impregnated support was dried at 120° C. for 2 hrs and calcined at 420° C. for 3 hrs to produce the hydrogenation demetalling catalyst CII-1. The molybdenum content and the cobalt content of the hydrogenation demetalling catalyst CII-1 (calculated as MoO3 and CoO respectively) were listed in Table B-4.

Hydrogenation demetalling catalyst CII-2: 200 g of the support SII-2 was impregnated in 200 mL of a mixed solution of molybdenum oxide and basic nickel carbonate (having a molybdenum content, calculated as MoO3, of 53.1 g/L, and a nickel content, calculated as NiO, of 10.6 g/L) for 1 hr. The impregnated support was dried at 120° C. for 2 hrs and calcined at 420° C. for 3 hrs to produce the hydrogenation demetalling catalyst CII-2. The molybdenum content and the nickel content of the hydrogenation demetalling catalyst CII-2 (calculated as MoO3 and NiO respectively) were listed in Table B-4.

Hydrogenation demetalling catalyst CII-3: 200 g of the support SII-3 was impregnated in 205 mL of a mixed solution of ammonium molybdate and nickel nitrate (having a molybdenum content, calculated as MoO3, of 78.5 g/L, and a nickel content, calculated as NiO, of 15.7 g/L) for 1 hr. The impregnated support was dried at 120° C. for 2 hrs and calcined at 420° C. for 3 his to produce the hydrogenation demetalling catalyst CII-3. The molybdenum content and the nickel content of the hydrogenation demetalling catalyst CII-3 (calculated as MoO3 and NiO respectively) were listed in Table B-4.

Hydrogenation demetalling catalyst CII-4: 200 g of the support SII-4 was impregnated in 210 mL of a mixed solution of molybdenum oxide and basic nickel carbonate (having a molybdenum content, calculated as MoO3, of 67.9 g/L, and a nickel content, calculated as NiO, of 11.3 g/L) for 1 hr. The impregnated support was dried at 120° C. for 2 hrs and calcined at 420° C. for 3 his to produce the hydrogenation demetalling catalyst CII-4. The molybdenum content and the nickel content of the hydrogenation demetalling catalyst CII-4 (calculated as MoO3 and NiO respectively) were listed in Table B-4.

Hydrogenation demetalling catalyst CII-5: 200 g of the support SII-8 was impregnated in 200 mL of a mixed solution of molybdenum oxide and basic cobalt carbonate (having a molybdenum content, calculated as MoO3, of 82.8 g/L, and a cobalt content, calculated as CoO, of 19.1 g/L) for 1 hr. The impregnated support was dried at 120° C. for 2 his and calcined at 420° C. for 3 his to produce the hydrogenation demetalling catalyst CII-5. The molybdenum content and the cobalt content of the hydrogenation demetalling catalyst CII-5 (calculated as MoO3 and CoO respectively) were listed in Table B-4.

Comparative hydrogenation demetalling catalyst CCII-1: 200 g of the comparative support CSII-1 was impregnated in 180 mL of a mixed solution of molybdenum oxide and basic cobalt carbonate (having a molybdenum content, calculated as MoO3, of 79.2 g/L, and a cobalt content, calculated as CoO, of 13.2 g/L) for 1 hr. The impregnated support was dried at 120° C. for 2 his and calcined at 420° C. for 3 hrs to produce the comparative catalyst CCII-1. The molybdenum content and the cobalt content of the comparative catalyst CCII-1 (calculated as MoO3 and CoO respectively) were listed in Table B-4.

Comparative hydrogenation demetalling catalyst CCII-2: 200 g of the comparative support CSII-1 was impregnated in 180 mL of a mixed solution of molybdenum oxide and basic nickel carbonate (having a molybdenum content, calculated as MoO3, of 59.0 g/L, and a nickel content, calculated as NiO, of 11.8 g/L) for 1 hr. The impregnated support was dried at 120° C. for 2 hrs and calcined at 420° C. for 3 hrs to produce the comparative catalyst CCII-2. The molybdenum content and the nickel content of the comparative catalyst CCII-2 (calculated as MoO3 and NiO respectively) were listed in Table B-4.

Comparative hydrogenation demetalling catalyst CCII-3: 200 g of the comparative support CSII-2 was impregnated in 180 mL of a mixed solution of molybdenum oxide and basic nickel carbonate (having a molybdenum content, calculated as MoO3, of 87.2 g/L, and a nickel content, calculated as NiO, of 17.4 g/L) for 1 hr. The impregnated support was dried at 120° C. fear 2 hrs and calcined at 420° C. for 3 hrs to produce the comparative catalyst CCII-3. The molybdenum content and the nickel content of the comparative catalyst CCII-3 (calculated as MoO3 and NiO respectively) were listed in Table B-4.

Comparative hydrogenation & demetalling catalyst CCII-4: 200 g of the comparative support CSII-3 was impregnated in 200 mL of a mixed solution of molybdenum oxide and basic cobalt carbonate (having a molybdenum content, calculated as MoO3, of 82.8 g/L, and a cobalt content, calculated as CoO, of 19.1 g/L) for 1 hr. The impregnated support was dried at 120° C. for 2 hrs and calcined at 420° C. for 3 hrs to produce the comparative catalyst CCII-4. The molybdenum content and the cobalt content of the comparative catalyst CCII-4 (calculated as MoO3 and CoO respectively) were listed in Table B-4.

TABLE B-4

| Catalyst | Support | Metal oxide content (wt %) | | |
|---|---|---|---|---|
| | | MoO3 | NiO | CoO |
| CII-1 | Support SII-1 | 6.6 | | 1.1 |
| CII-2 | Support SII-2 | 5.0 | 1.0 | |
| CII-3 | Support SII-3 | 7.3 | 1.5 | |
| CII-4 | Support SII-4 | 6.6 | 1.1 | |
| CII-5 | Support SII-8 | 7.8 | | 1.8 |
| CCII-1 | Comparative support CSII-1 | 6.6 | | 1.1 |
| CCII-2 | Comparative support CSII-1 | 5.0 | 1.0 | |
| CCII-3 | Comparative support CSII-2 | 7.3 | 1.5 | |
| CCII-4 | Comparative support CSII-3 | 7.8 | | 1.8 |

Hydrogenation Treatment Catalyst CIII

Hydrogenation treatment catalyst CIII-1: the hydrogenation treatment catalyst was prepared according to the method disclosed in the Chinese application ZL97112397, and contained 3 wt % of nickel (calculated as NiO), 25 wt % of tungsten (calculated as WO3), 2 wt % of fluorine (calculated as F), and the balance of alumina.

Hydrogenation treatment catalyst CIII-2: the hydrogenation treatment catalyst CIII-2 was prepared according to the method disclosed in the Chinese application ZL97112397, and contained 4 wt % of nickel (calculated as NiO), 30 wt % of tungsten (calculated as WO3), 2 wt %/of fluorine (calculated as F), and the balance of alumina.

Hydrogenation treatment catalyst CIII-3: the hydrogenation treatment catalyst CIII-3 was prepared according to the method disclosed in the Chinese application ZL00802168, and contained 3.5 wt % of nickel (calculated as NiO), 18 wt % of molybdenum (calculated as MoO3), and the balance of alumina.

The effects of hydrogenating the heavy residual oil with the combinations of the above catalysts were illustrated by the following examples.

A mixed residual oil having an asphaltine content of 9.2 wt %, a Fe+Ca content of 25 ppmw, a Ni+V content of 113 ppmw, a sulfur content of 3.9 wt %, and a residual carbon content of 13 wt % was used as raw oil B. The performances of the combinations of the above catalysts were evaluated with a 500 mL fixed bed reactor.

The contents of Fe, Ca, Ni and V in the oil sample were measured according to RIPP 124-90.

The asphaltine content in the oil sample was measured according to RIPP 10-90.

The sulfur content in the oil sample was measured according to RIPP 62-90.

The content of the residual carbon in the oil sample was measured according to RIPP 149-90.

Example B-1

The above raw oil B was hydrogenated with the catalyst combination of the hydrogenation protection catalyst CI-1, the hydrogenation demetalling catalyst CII-1 and the hydrogenation treatment catalyst CIII-1.

In this catalyst combination, the charging volume ratio of three catalysts in the reactor and the operation conditions were listed in Table B-5. After a 1000-hour operation, a sample was taken from the reactor and analyzed. The product properties were also listed in Table B-5.

Example B-2

The above raw oil B was hydrogenated with the catalyst combination of the hydrogenation protection catalyst CI-2, the hydrogenation demetalling catalyst CII-2 and the hydrogenation treatment catalyst CIII-2.

In this catalyst combination, the charging volume ratio of three catalysts in the reactor and the operation conditions were listed in Table B-5. After a 1000-hour operation, a sample was taken from the reactor and analyzed. The product properties were also listed in Table B-5.

Example B-3

The above raw oil B was hydrogenated with the catalyst combination of the hydrogenation protection catalyst CI-3, the hydrogenation demetalling catalyst CII-3 and the hydrogenation treatment catalyst CIII-3.

In this catalyst combination, the charging volume ratio of three catalysts in the reactor and the operation conditions were listed in Table B-5. After a 1000-hour operation, a sample was taken from the reactor and analyzed. The product properties were also listed in Table B-5.

Example B-4

The above raw oil B was hydrogenated with the catalyst combination of the hydrogenation protection catalyst CI-5, the hydrogenation demetalling catalyst CII-4 and the hydrogenation treatment catalyst CIII-3.

In this catalyst combination, the charging volume ratio of three catalysts in the reactor and the operation conditions were listed in Table B-5. After a 1000-hour operation, a sample was taken from the reactor and analyzed. The product properties were also listed in Table B-5.

Example B-C1

The above raw oil B was hydrogenated with the catalyst combination of the hydrogenation protection catalyst CI-2, the comparative hydrogenation demetalling catalyst CCII-2 and the hydrogenation treatment catalyst CIII-2.

In this catalyst combination, the charging volume ratio of three catalysts in the reactor and the operation conditions were listed in Table B-5. After a 1000-hour operation, a sample was taken from the reactor and analyzed. The product properties were also listed in Table B-5.

Example B-C2

The above raw oil B was hydrogenated with the catalyst combination of the hydrogenation protection catalyst CI-3, the comparative hydrogenation demetalling catalyst CCII-3 and the hydrogenation treatment catalyst CIII-3.

In this catalyst combination, the charging volume ratio of three catalysts in the reactor and the operation conditions were listed in Table B-5. After a 1000-hour operation, a sample was taken from the reactor and analyzed. The product properties were also listed in Table B-5.

Example B-C3

The above raw oil B was hydrogenated with the catalyst combination of the hydrogenation protection catalyst CI-6, the comparative hydrogenation demetalling catalyst CCII-4 and the hydrogenation treatment catalyst CIII-1

In this catalyst combination, the charging volume ratio of three catalysts in the reactor and the operation conditions were listed in Table B-5. After a 1000-hour operation, a sample was taken from the reactor and analyzed. The product properties were also listed in Table B-5.

TABLE B-5

| | Example | | | | | | |
|---|---|---|---|---|---|---|---|
| | B-1 | B-2 | B-3 | B-4 | B-C1 | B-C2 | B-C3 |
| Hydrogenation protection catalyst CI, vol % | 10 | 15 | 20 | 25 | 15 | 20 | 25 |
| Hydrogenation demetalling catalyst CII, vol % | 30 | 35 | 30 | 35 | 35 | 30 | 35 |
| Hydrogenation treatment catalyst CIII, vol % | 60 | 50 | 50 | 40 | 50 | 50 | 40 |
| Hydrogen/oil volume ratio | 800 | 850 | 750 | 900 | 800 | 900 | 850 |
| Hydrogen partial pressure/MPa | 14.0 | 15.0 | 15.0 | 14.5 | 15.0 | 15.0 | 15.0 |
| Reaction Temperature/° C. | 375 | 380 | 385 | 380 | 380 | 370 | 380 |
| Space velocity/$h^{-1}$ | 0.25 | 0.3 | 0.3 | 0.25 | 0.3 | 0.2 | 0.3 |
| Product properties | | | | | | | |
| Asphaltine Content, wt % | 0.38 | 0.42 | 0.28 | 0.40 | 1.4 | 1.8 | 2.0 |
| Fe + Ca/$\mu g \cdot g^{-1}$ | 5 | 6 | 4 | 5 | 8 | 9 | 7 |
| Ni + V/$\mu g \cdot g^{-1}$ | 8 | 13 | 10 | 14 | 25 | 21 | 23 |
| Sulfur content, wt % | 0.36 | 0.39 | 0.46 | 0.47 | 0.53 | 0.51 | 0.56 |
| Residual carbon content, wt % | 5.0 | 5.1 | 5.6 | 5.8 | 6.3 | 6.2 | 6.8 |

Example C

Hydrogenation Demetalling Catalyst CI

In this example, the catalyst RDM-2 produced by Sinopec Changling Catalyst Division can be used as the hydrogenation demetalling catalyst CI.

In this example, the catalysts prepared by the following procedure can also be used as the hydrogenation demetalling catalyst CI.

Preparation of the Support SI of the Hydrogenation Demetalling Catalyst CI

According to Examples 1, 2 and 3 of the Chinese patent application 201010188605.X, the supports SIs of the hydrogenation demetalling catalyst CI as shown in Table C-1 were obtained.

TABLE C-1

| Alumina support | Support SI-1 | Support SI-2 | Support SI-3 |
|---|---|---|---|
| Specific Surface Area, $m^2/g$ | 135 | 129 | 118 |
| Most probable pore diameter, nm | 24.9 | 25.0 | 26.5 |
| Average pore diameter, nm | 28.3 | 29.3 | 30.5 |
| Pore volume, mL/g | 0.95 | 0.94 | 0.90 |
| The ratio of the volume of the pores having a diameter of 10 nm-60 nm to the total pore volume, % | 98.7 | 99.2 | 99.6 |

Preparation of the Hydrogenation Demetalling Catalyst CI

With the following procedures, the hydrogenation demetalling catalysts CIs as shown in Table C-2 were obtained.

Hydrogenation demetalling catalyst CI-1: 90 g of the support SI-1 was impregnated in 120 mL of a mixed solution of ammonium molybdate and nickel nitrate (having a molybdenum content, calculated as MoO3, of 50 g/L, and a nickel content, calculated as NiO, of 10 g/L) for 1 hr. After filtering, the impregnated support was dried at 120° C. for 2 hrs, and calcined at 500° C. for 4 hrs to produce the hydrogenation demetalling catalyst CI-1. The composition of the hydrogenation demetalling catalyst CI-1 was listed in Table C-2.

Hydrogenation demetalling catalyst CI-2: 200 g of the support SI-2 was impregnated in 500 mL of a mixed solution of ammonium molybdate and nickel nitrate (having a molybdenum content, calculated as MoO3, of 35 g/L, and a nickel content, calculated as NiO, of 8 g/L) for 1 hr. After filtering, the impregnated support was dried at 120° C. for 2 hrs, and calcined at 480° C. for 4 hrs to produce the hydrogenation demetalling catalyst CI-2. The composition of the hydrogenation demetalling catalyst CI-2 was listed in Table C-2.

Hydrogenation demetalling catalyst CI-3: 200 g of the support SI-3 was impregnated in 500 mL of a mixed solution of ammonium molybdate and nickel nitrate (having a molybdenum content, calculated as MoO3, of 100 g/L, and a nickel content, calculated as NiO, of 20 g/L) for 1 hr. After filtering, the impregnated support was dried at 120° C. for 2 hrs, and calcined at 500° C. for 4 hrs to produce the hydrogenation demetalling catalyst CI-3. The composition of the hydrogenation demetalling catalyst CI-3 was listed in Table C-2.

TABLE C-2

| Hydrogenation demetalling catalyst CI | Support | Metal oxide content, wt % | |
|---|---|---|---|
| | | MoO3 | NiO |
| CI-1 | Support SI-1 | 5.5 | 1.2 |
| CI-2 | Support SI-2 | 4.0 | 1.0 |
| CI-3 | Support SI-3 | 9.0 | 2.0 |

The contents of active metal components in the catalyst were measured according to RIPP 133-90.

Hydrogenation Demetalling Catalyst CII

Preparation of the Support SII of the Hydrogenation Demetalling Catalyst CII

In this example, the following pseudoboehmite-containing hydrated aluminas P1s were used:

Hydrated alumina P1-1: A dried pseudoboehmite powder produced by Sinopec Changling Catalyst Division (having a pore volume of 1.2 mL/g, a specific surface area of 280 $m^2/g$, a most probable pore diameter of 15.8 nm, a dry basis weight percent of 73 wt %, wherein the content of pseudoboehmite was 68 wt %, the content of gibbsite was 5 wt %, and the balance was amorphous alumina, and a DI value of 15.8).

Hydrated alumina P1-2: A dried pseudoboehmite powder produced by Yantai Henghui Chemical Industry Co., Ltd (having a pore volume of 1.1 mL/g, a specific surface area of 260 $m^2/g$, a most probable pore diameter of 1.2 nm, a dry basis weight percent of 71 wt %, wherein the content of pseudoboehmite was 67 wt %, the content of gibbsite was 5 wt %, and the balance was amorphous alumina, and a DI value of 17.2).

In this example, the hydrated aluminas P1s were modified to produce the following modifiers P2s:

Modifier P2A: 1.000 g of the hydrated alumina P1-1 was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter φ of 1.4 mm. The resulting wet strips were dried at 120° C. for 4 hrs to produce dried strips. The resulting dried strips were reshaped and sieved. The sieved strips having a length of less than 2 mm were ground and sieved. The sieved fractions having 100-200 meshes were taken as the modifier P2A of the hydrated alumina P1-1. The modifier P2A had a κ value of 0.5.

Modifier P2B: 1000 g of the hydrated alumina P1-1 was flash-dried at 240° C. for 6 mins to produce the modifier P2B of the hydrated alumina P1-1. The modifier P2B had a κ value of 0.4.

Modifier P2C: the modifier P2A obtained in Example C and the modifier P2B obtained in Example C, each of which were in amounts of 200 g, were mixed evenly to produce the modifier P2C of the hydrated alumina P1-1. The modifier P2C had a κ value of 0.4.

Modifier P2D: 1000 g of the hydrated alumina P1-2 was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter φ of 1.4 mm. The resulting wet strips were dried at 120° C. for 4 hrs and calcined at 1200° C. for 4 hrs to produce the support strips. The resulting strips were reshaped and sieved. The sieved strips having a length of less than 2 mm were ground and sieved. The sieved fractions having 100-200 meshes were taken as the modifier P2D of the hydrated alumina P1-2. The modifier P2D had a κ value of 0.

Modifier P2E: 1000 g of the hydrated alumina P1-2 was flash-dried at 650° C. for 10 mins to produce the modifier P2E of the hydrated alumina P1-2. The modifier P2E had a κ value of 0.3.

With the following procedures, the supports SIIs and the comparative supports CSIIs of the hydrogenation demetalling catalyst CII as shown in Table C-3 were obtained.

Support SII-1: 800 g of the hydrated alumina P1-1 and 200 g of the modifier P2A produced in Example C as starting materials were mixed evenly. The mixture was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter ϕ of 1.4 mm. The resulting wet strips were dried at 120° C. for 4 hrs to produce shaped bodies. The shaped bodies were calcined at 900° C. for 3 hrs to produce the support SII-1. The properties of the support SII-1 were listed in Table C-3.

Support SII-2: 200 g of the hydrated alumina P1-1 and 800 g of the modifier P2B produced in Example C as starting materials were mixed evenly. The mixture was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter (13 of 1.4 mm. The resulting wet strips were dried at 120° C. for 4 hrs to produce shaped bodies. The shaped bodies were calcined at 900° C. for 3 hrs to produce the support SII-2. The properties of the support SII-2 were listed in Table C-3.

Support SII-3: 500 g of the hydrated alumina P1-1 and 500 g of the modifier P2C produced in Example C as starting materials were mixed evenly. The mixture was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter ϕ of 1.4 mm. The resulting wet strips were dried at 120° C. for 4 hrs to produce shaped bodies. The shaped bodies were calcined at 950° C. for 3 hrs to produce the support SII-3. The properties of the support SII-3 were listed in Table C-3.

Support SII-4: 800 g of the hydrated alumina P1-2 and 200 g of the modifier P2D produced in Example C as starting materials were mixed evenly. The mixture was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter ϕ of 1.4 mm. The resulting wet strips were dried at 120° C. for 4 hrs to produce shaped bodies. The shaped bodies were calcined at 1000° C. for 3 hrs to produce the support SII-4. The properties of the support SII-4 were listed in Table C-3.

Support SII-5: 900 g of the hydrated alumina P1-1 and 100 g of the modifier P2E produced in Example C as starting materials were mixed evenly. The mixture was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter ϕ of 1.4 mm. The resulting wet strips were dried at 120° C. for 4 hrs to produce shaped bodies. The shaped bodies were calcined at 1000° C. for 3 hrs to produce the support SII-5. The properties of the support SII-5 were listed in Table C-3.

Support SII-6: 850 g of the hydrated alumina P1-2 and 150 g of the modifier P2C produced in Example C as starting materials were mixed evenly. The mixture was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter ϕ of 1.4 mm. The resulting wet strips were dried at 120° C. for 4 hrs to produce shaped bodies. The shaped bodies were calcined at 850° C. for 3 hrs to produce the support SII-6. The properties of the support SII-6 were listed in Table C-3.

Support SII-7: 900 g of the hydrated alumina P1-2 and 100 g of the modifier P2D produced in Example C as starting materials were mixed evenly. The mixture was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter ϕ of 1.4 mm. The resulting wet strips were dried at 120° C. for 4 hrs to produce shaped bodies. The shaped bodies were calcined at 1000° C. for 3 hrs to produce the support SII-7. The properties of the support SII-7 were listed in Table C-3.

Support SII-8: 850 g of the hydrated alumina P1-2 and 150 g of the modifier P2E produced in Example C as starting materials were mixed evenly. The mixture was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter ϕ of 1.4 mm. The resulting wet strips were dried at 120° C. for 4 hrs to produce shaped bodies. The shaped bodies were calcined at 400° C. for 3 hrs to produce the support SII-8. The properties of the support SII-8 were listed in Table C-3.

Comparative support CSII-1: 1000 g of the hydrated alumina P1-1 was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter ϕ of 1.4 mm. The resulting wet strips were dried at 120° C. tier 4 hrs to produce shaped bodies. The shaped bodies were calcined at 900° C. for 3 hrs to produce the comparative support CSII-1. The properties of the comparative support CSII-1 were listed in Table C-3.

Comparative support CSII-2: 1000 g of the hydrated alumina P1-2 was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter ϕ of 1.4 mm. The resulting wet strips were dried at 120° C. for 4 hrs to produce shaped bodies. The shaped bodies were calcined at 1000° C. for 3 hrs to produce the comparative support CSII-2. The properties of the comparative support CSII-2 were listed in Table C-3.

Comparative support CSII-3: According to the procedure provided in Example 9 of CN1782031A, the mixture was extruded on a twin-screw extruder into papilionaceous strips having an outer diameter ϕ of 1.4 mm. The resulting wet strips were dried at 120° C. for 4 hrs to produce shaped bodies. The shaped bodies were calcined at 900° C. for 3 hrs to produce the comparative support CSII-3. The properties of the comparative support CSII-3 were listed in Table C-3.

TABLE C-3

| Support | Specific surface area/ (m2/g) | Pore volume measured by mercury porosimetry/ (mL/g) | Percent of the 10 nm-30 nm pore volume relative to the total pore volume/% | Percent of the 300 nm-500 nm pore volume relative to the total pore volume/% |
|---|---|---|---|---|
| Support SII-1 | 178 | 1.06 | 66 | 26 |
| Support SII-2 | 150 | 1.14 | 60 | 30 |
| Support SII-3 | 145 | 1.13 | 61 | 28 |
| Support SII-4 | 130 | 1.15 | 65 | 30 |
| Support SII-5 | 142 | 1.09 | 64 | 25 |
| Support SII-6 | 172 | 1.07 | 65 | 19 |
| Support SII-7 | 135 | 1.09 | 62 | 24 |
| Support SII-8 | 161 | 1.00 | 61 | 18 |
| Comparative support CSII-1 | 228 | 0.85 | 80 | 0 |
| Comparative support CSII-2 | 230 | 0.88 | 81 | 0 |
| Comparative support CSII-3 | 165 | 1.08 | 42.3 | 10.2 |

Preparation of the Hydrogenation Demetalling Catalyst CII

With the following procedures, the hydrogenation demetalling catalysts CIIs and the comparative hydrogenation demetalling catalysts CCIIs as shown in Table C-4 were obtained.

Hydrogenation demetalling catalyst CII-1: 200 g of the support SII-1, was impregnated 210 mL of a mixed solution of molybdenum oxide and basic cobalt carbonate (having a molybdenum content, calculated as MoO3, of 67.9 g/L, and a cobalt content, calculated as CoO, of 11.3 g/L) for 1 hr. The impregnated support was dried at 120° C. for 2 hrs and calcined at 420° C. for 3 hrs to produce the hydrogenation demetalling catalyst CII-1. The molybdenum content and the cobalt content of the hydrogenation demetalling catalyst CII-1 (calculated as MoO3 and CoO respectively) were listed in Table C-4.

Hydrogenation demetalling catalyst CII-2: 200 g of the support SII-2 was impregnated in 200 mL of a mixed solution of molybdenum oxide and basic nickel carbonate (having a molybdenum content, calculated as MoO3, of 53.1 g/L, and a nickel content, calculated as NiO, of 10.6 g/L) for 1 hr. The impregnated support was dried at 120° C. for 2 hrs and calcined at 420° C. thr 3 hrs to produce the hydrogenation demetalling catalyst CII-2. The molybdenum content and the nickel content of the hydrogenation demetalling catalyst CII-2 (calculated as MoO3 and NiO respectively) were listed in Table C-4.

Hydrogenation demetalling catalyst CII-3: 200 g of the support SII-3 was impregnated in 205 mL of a mixed solution of ammonium molybdate and nickel nitrate (having a molybdenum content, calculated as MoO3, of 78.5 g/L, and a nickel content, calculated as NiO, of 15.7 g/L) for 1 hr. The impregnated support was dried at 120° C. for 2 hrs and calcined at 420° C. for 3 hrs to produce the hydrogenation demetalling catalyst CII-3. The molybdenum content and the nickel content of the hydrogenation demetalling catalyst CII-3 (calculated as MoO3 and NiO respectively) were listed in Table C-4.

Hydrogenation demetalling catalyst CII-4: 200 g of the support SII-4 was impregnated in 210 mL of a mixed solution of molybdenum oxide and basic nickel carbonate (having a molybdenum content, calculated as MoO3, of 67.9 g/L, and a nickel content, calculated as NiO, of 11.3 g/L) for 1 hr. The impregnated support was dried at 120° C. for 2 hrs and calcined at 420° C. for 3 hrs to produce the hydrogenation demetalling catalyst CII-4. The molybdenum content and the nickel content of the hydrogenation demetalling catalyst CII-4 (calculated as MoO3 and NiO respectively) were listed in Table C4.

Hydrogenation demetalling catalyst CII-5: 200 g of the support SII-8 was impregnated in 200 mL of a mixed solution of molybdenum oxide and basic cobalt carbonate (having a molybdenum content, calculated as MoO3, of 82.8 g/L, and a cobalt content, calculated as CoO, 19.1 g/L) for 1 hr. The impregnated support was dried at 120° C. for 2 hrs and calcined at 420° C. for 3 hrs to produce the hydrogenation demetalling catalyst CII-5. The molybdenum content and the cobalt content of the hydrogenation demetalling catalyst CII-5 (calculated as MoO3 and CoO respectively) were listed in Table C-4.

Comparative hydrogenation demetalling catalyst CCII-1: 200 g of the comparative support CSII-1 was impregnated in 1.80 mL of a mixed solution of molybdenum oxide and basic cobalt carbonate (having a molybdenum content, calculated as MoO3, of 79.2 g/L, and a cobalt content, calculated as CoO, of 13.2 g/L) for 1 hr. The impregnated support was dried at 120° C. for 2 hrs and calcined at 420° C. for 3 hrs to produce the comparative catalyst CCII-1. The molybdenum content and the cobalt content of the comparative catalyst CCII-1 (calculated as MoO3 and CoO respectively) were listed in Table C-4.

Comparative hydrogenation demetalling catalyst CCII-2: 200 g of the comparative support CSII-1 was impregnated in 180 mL of a mixed solution of molybdenum oxide and basic nickel carbonate (having a molybdenum content, calculated as MoO3, of 59.0 g/l and a nickel content, calculated as NiO, of 11.8 g/L) for 1 hr. The impregnated support was dried at 120° C. for 2 hrs and calcined at 420° C. for 3 hrs to produce the comparative catalyst CCII-2. The molybdenum content and the nickel content of the comparative catalyst CCII-2 (calculated as MoO3 and NiO respectively) were listed in Table C-4.

Comparative hydrogenation demetalling catalyst CCII-3: 200 g of the comparative support CSII-2 was impregnated in 180 mL of a mixed solution of molybdenum oxide and basic nickel carbonate (having a molybdenum content, calculated as MoO3, of 87.2 g/l, and a nickel content, calculated as NiO, of 17.4 g/L) for 1 hr. The impregnated support was dried at 120° C. for 2 hrs and calcined at 420° C. for 3 hrs to produce the comparative catalyst CCII-3. The molybdenum content and the nickel content of the comparative catalyst CCII-3 (calculated as MoO3 and NiO respectively) were listed in Table C-4.

Comparative hydrogenation demetalling catalyst CCII-4: 200 g of the comparative support CSII-3 was impregnated in 200 mL of a mixed solution of molybdenum oxide and basic cobalt carbonate (having a molybdenum content, calculated as MoO3, of 82.8 g/L, and a cobalt content, calculated as CoO, of 19.1 g/L) for 1 hr. The impregnated support was dried at 120° C. for 2 hrs and calcined at 420° C. for 3 hrs to produce the comparative catalyst CCII-4. The molybdenum content and the cobalt content of the comparative catalyst CCII-4 (calculated as MoO3 and CoO respectively) were listed in Table C-4.

TABLE C-4

| Catalyst | Support | Metal oxide content (wt %) | | |
|---|---|---|---|---|
| | | MoO3 | NiO | CoO |
| CII-1 | Support SII-1 | 6.6 | | 1.1 |
| CII-2 | Support SII-2 | 5.0 | 1.0 | |
| CII-3 | Support SII-3 | 7.3 | 1.5 | |
| CII-4 | Support SII-4 | 6.6 | 1.1 | |
| CII-5 | Support SII-8 | 7.8 | | 1.8 |
| CCII-1 | Comparative support CSII-1 | 6.6 | | 1.1 |
| CCII-2 | Comparative support CSII-1 | 5.0 | 1.0 | |
| CCII-3 | Comparative support CSII-2 | 7.3 | 1.5 | |
| CCII-4 | Comparative support CSII-3 | 7.8 | | 1.8 |

Hydrogenation Treatment Catalyst CIII

Hydrogenation treatment catalyst CIII-1: the hydrogenation treatment catalyst CIII-1 was prepared according to the method disclosed in the Chinese application ZL97112397, and contained 3 wt % of nickel (calculated as NiO), 25 wt % of tungsten (calculated as WO3), 2 wt % of fluorine (calculated as F), and the balance of alumina.

Hydrogenation treatment catalyst CIII-2: the hydrogenation treatment catalyst CIII-2 was prepared according to the method disclosed in the Chinese application ZL97112397, and contained 4 wt % of nickel (calculated as NiO), 30 wt % of tungsten (calculated as WO3), 2 wt % of fluorine (calculated as F), and the balance of alumina.

Hydrogenation treatment catalyst CIII-3: the hydrogenation treatment catalyst CIII-3 was prepared according to the method disclosed in the Chinese application ZL00802168, and contained 3.5 wt % of nickel (calculated as NiO), 18 wt % of molybdenum (calculated as MoO3), and the balance of alumina.

The effects of hydrogenating the heavy residual oil with the combinations of the above catalysts were illustrated by the following examples.

A mixed residual oil having a Ni+V content of 178 ppmw, a sulfur content of 3.9 wt %, and a residual carbon content of 12 wt % was used as raw oil C. The performances of the combinations of the above catalysts were evaluated with a 500 mL fixed bed reactor.

The contents of Ni and V in the oil sample were measured according to RIPP 124-90.

The sulfur content in the oil sample was measured according to RIPP 62-90.

The content of the residual carbon in the oil sample was measured according to RIPP 149.90.

Example C-1

The above raw oil C was hydrogenated with the catalyst combination of the hydrogenation demetalling catalyst CI-1, the hydrogenation demetalling catalyst CII-1 and the hydrogenation treatment catalyst CIII-1.

In this catalyst combination, the charging volume ratio of three catalysts in the reactor and the operation conditions were listed in Table C-5. After a 3000-hour operation, a sample was taken from the reactor and analyzed. The product properties were also listed in Table C-5.

Example C-2

The above raw oil C was hydrogenated with the catalyst combination of the hydrogenation demetalling catalyst CI-2, hydrogenation demetalling catalyst CII-2 and the hydrogenation treatment catalyst CIII-2.

In this catalyst combination, the charging volume ratio of three catalysts in the reactor and the operation conditions were listed in Table C-5. After a 3000-hour operation, a sample was taken from the reactor and analyzed. The product properties were also listed in Table C-5.

Example C-3

The above raw oil C was hydrogenated with the catalyst combination of the hydrogenation demetalling catalyst CI-3, hydrogenation demetalling catalyst CII-3 and the hydrogenation treatment catalyst CIII-3.

In this catalyst combination, the charging volume ratio of three catalysts in the reactor and the operation conditions were listed in Table C-5. After a 3000-hour operation, a sample was taken from the reactor and analyzed. The product properties were also listed in Table C-5.

Example C-4

The above raw oil C was hydrogenated with the catalyst combination of the catalyst RDM-2 produced by Sinopec Changling Catalyst Division as the hydrogenation demetalling catalyst CI, the hydrogenation demetalling catalyst CII-3 and the hydrogenation treatment catalyst CIII-3.

In this catalyst combination, the charging volume ratio of three catalysts in the reactor and the operation conditions were listed in Table C-5. After a 3000-hour operation, a sample was taken from the reactor and analyzed. The product properties were also listed in Table C-5.

Example C-C1

The above raw oil C was hydrogenated with the catalyst combination of the hydrogenation demetalling catalyst CI-1 and the hydrogenation treatment catalyst CIII-1.

In this catalyst combination, the charging volume ratio of two catalysts in the reactor and the operation conditions were listed in Table C-5. After a 3000-hour operation, a sample was taken from the reactor and analyzed. The product properties were also listed in Table C-5.

Example C-C2

The above raw oil C was hydrogenated with the catalyst combination of the hydrogenation demetalling catalyst CI-1, the comparative hydrogenation demetalling catalyst CCII-3 and the hydrogenation treatment catalyst CIII-1.

In this catalyst combination, the charging volume ratio of three catalysts in the reactor and the operation conditions were listed in Table C-5. After a 3000-hour operation, a sample was taken from the reactor and analyzed. The product properties were also listed in Table C-5.

Example C-C3

The above raw oil C was hydrogenated with the catalyst combination of the catalyst RDM-2 produced by Sinopec Changling Catalyst Division as the hydrogenation demetalling catalyst CI, the comparative hydrogenation demetalling catalyst CCII-4, and the hydrogenation treatment catalyst CIII-1.

In this catalyst combination, the charging volume ratio of three catalysts in the reactor and the operation conditions were listed in Table C-5. After a 3000-hour operation, a sample was taken from the reactor and analyzed. The product properties were also listed in Table C-5.

TABLE C-5

| | Catalyst | | | | | | |
|---|---|---|---|---|---|---|---|
| | C-1 | C-2 | C-3 | C-4 | C-C1 | C-C2 | C-C3 |
| Hydrogenation demetalling catalyst CI, % | 15 | 25 | 35 | 30 | 50 | 20 | 25 |
| Hydrogenation demetalling catalyst CII, % | 35 | 35 | 20 | 25 | — | 30 | 30 |
| Hydrogenation treatment catalyst CIII, % | 50 | 40 | 45 | 45 | 50 | 50 | 45 |
| Hydrogen/oil volume ratio | 800 | 850 | 750 | 900 | 800 | 900 | 850 |
| Hydrogen partial pressure/MPa | 14.0 | 15.0 | 13.8 | 15.0 | 14.0 | 14.0 | 14.0 |
| Reaction Temperature/° C. | 375 | 380 | 370 | 380 | 375 | 375 | 375 |
| Space velocity/h$^{-1}$ | 0.25 | 0.3 | 0.2 | 0.2 | 0.25 | 0.25 | 0.25 |
| After 5000-hour reaction | | | | | | | |
| Pressure drop, kg | 0.4 | 0.3 | 0.35 | 0.5 | 0.7 | 2.1 | 1.8 |
| Product properties | | | | | | | |
| Ni + V/μg · g$^{-1}$ | 11 | 12 | 10 | 17 | 25 | 34 | 32 |
| Sulfur content, wt % | 0.32 | 0.40 | 0.43 | 0.5 | 0.78 | 0.63 | 0.72 |
| Residual carbon content, wt % | 5.0 | 4.9 | 5.6 | 5.8 | 8.9 | 8.6 | 7.8 |

Example D

Hydrogenation Demetalling Catalyst CI

In this example, the catalyst RDM-2 produced by Sinopec Changling Catalyst Division can be used as the hydrogenation demetalling catalyst CI.

In this example, the catalysts prepared by the following procedure can also be used as the hydrogenation demetalling catalyst CI.

Preparation of the Support SI of the Hydrogenation Demetalling Catalyst CI

According to Examples 2 and 3 of the Chinese patent application 201010188605.X, the supports SIs of the hydrogenation demetalling catalyst CI as shown in Table D-1 were obtained.

TABLE D-1

| Alumina support | Support SI-1 | Support SI-2 | Support SI-3 |
|---|---|---|---|
| Specific Surface Area, m$^2$/g | 135 | 129 | 118 |
| Most probable pore diameter, nm | 24.9 | 25.0 | 26.5 |
| Average pore diameter, nm | 28.3 | 29.3 | 30.5 |
| Pore volume, mL/g | 0.95 | 0.94 | 0.90 |
| The ratio of the volume of the pores having a diameter of 10 nm-60 nm to the total pore volume, % | 98.7 | 99.2 | 99.6 |

Preparation of the Hydrogenation Demetalling Catalyst CI

With the following procedures, the hydrogenation demetalling catalysts CIs as shown in Table D-2 were obtained.

Hydrogenation demetalling catalyst CI-1: 90 g of the support was impregnated in 120 mL of a mixed solution of ammonium molybdate and nickel nitrate (having a molybdenum content, calculated as MoO3, of 50 g/L, and a nickel content, calculated as NiO, of 10 g/L) for 1 hr. After filtering, the impregnated support was dried at 120° C. for 2 hrs, and calcined at 500° C. for 4 hrs to produce the hydrogenation demetalling catalyst CI-1. The composition of the hydrogenation demetalling catalyst CI-1 was listed in Table D-2.

Hydrogenation demetalling catalyst CI-2: 200 g of the support SI-2 was impregnated in 500 mL of a mixed solution of ammonium molybdate and nickel nitrate (having a molybdenum content, calculated as MoO3, of 35 g/L, and a nickel content, calculated as NiO, of 8 g/L) for 1 hr. After filtering, the impregnated support was dried at 1.20° C. for 2 hrs, and calcined at 480° C. for 4 hrs to produce the hydrogenation demetalling catalyst CI-2. The composition of the hydrogenation demetalling catalyst CI-2 was listed in Table D-2.

Hydrogenation demetalling catalyst CI-3: 200 g of the support SI-3 was impregnated in 500 mL of a mixed solution of ammonium molybdate and nickel nitrate (having a molybdenum content, calculated as MoO3, of 100 g/L, and a nickel content, calculated as NiO, of 20 g/L) for 1 hr. After filtering, the impregnated support was dried at 120° C. for 2 hrs, and calcined at 500° C. for 4 hrs to produce the hydrogenation demetalling catalyst CI-3. The composition of the hydrogenation demetalling catalyst CI-3 was listed in Table D-2.

TABLE D-2

| Hydrogenation demetalling catalyst CI | Support | Metal oxide content, wt % | |
|---|---|---|---|
| | | MoO3 | NiO |
| CI-1 | Support SI-1 | 5.5 | 1.2 |
| CI-2 | Support SI-2 | 4.0 | 1.0 |
| CI-3 | Support SI-3 | 9.0 | 2.0 |

The contents of active metal components in the catalyst were measured according to RIPP 133-90.

Hydrogenation Demetalling Catalyst CII
Preparation of the Support SII of the Hydrogenation Demetalling Catalyst CII In this example, the following pseudoboehmite-containing hydrated aluminas P1s were used:

Hydrated alumina P1-1: A dried pseudoboehmite powder produced by Sinopec Changling Catalyst Division (having a pore volume of 1.2 mL/g, a specific surface area of 280 m$^2$/g, a most probable pore diameter of 15.8 nm, a dry basis weight percent of 73 wt %, wherein the content of pseudoboehmite was 68 wt %, the content of gibbsite was 5 wt %, and the balance was amorphous alumina, and a DI value of 15.8).

Hydrated alumina P1-2: A dried pseudoboehmite powder produced by Yantai Henghui Chemical Industry Co., Ltd (having a pore volume of 1 mL/g, a specific surface area of 260 m$^2$/g, a most probable pore diameter of 12 nm, a dry basis weight percent of 71 wt %, wherein the content of pseudoboehmite was 67 wt %, the content of gibbsite was 5 wt %, and the balance was amorphous alumina, and a DI value of 17.2).

In this example, the hydrated aluminas P1s were modified to produce the following modifiers P2s:

Modifier P2A; 1000 g of the hydrated alumina P1-1 was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter φ of 1.4 mm. The resulting wet strips were dried at 120° C. for 4 hrs to produce dried strips. The resulting dried strips were reshaped and sieved. The sieved strips having a length of less than 2 mm were around and sieved. The sieved fractions having 100-200 meshes were taken as the modifier P2A of the hydrated alumina P1-1. The modifier P2A had ax value of 0.5.

Modifier P2B: 1000 g of the hydrated alumina P1-1 was flash-dried at 240° C. for burins to produce the modifier P2B of the hydrated alumina P1-1. The modifier P2B had a κ value of 0.4.

Modifier P2C: the modifier P2A obtained in Example 1) and the modifier P2B obtained in Example D, each of which were in amounts of 200 g, were mixed evenly to produce the modifier P2C of the hydrated alumina P1-1. The modifier P2C had a κ value of 0.4.

Modifier P2D: 1000 g of the hydrated alumina P1-2 was added to 1440 mL of an aqueous solution containing 10 mL of nitric acid (a product available from Tianjin No. 3 Chemical Reagent Factory). The mixture was extruded on a twin-screw extruder into papilionaceous strips having an outer diameter φ of 1.4 mm. The resulting wet strips were dried at 120° C. for 4 hrs and calcined at 1200° C. for 4 hrs to produce the support strips. The resulting strips were reshaped and sieved. The sieved strips having a length of less than 2 min were ground and sieved. The sieved fractions having 100-200 meshes were taken as the modifier P2D of the hydrated alumina P1-2. The modifier P21) had a κ value of 0.

Modifier P2E: 1000 g of the hydrated alumina P1-2 was flash-dried at 650° C. for 10 mins to produce the modifier P2E of the hydrated alumina P1-2. The modifier P2E had a κ value of 0.3.

With the following procedures, the supports SIIs and the comparative supports CSIIs of the hydrogenation demetalling catalyst CII as shown in Table D-3 were obtained.

Support SII-1: 800 g of the hydrated alumina P1-1 and 200 g of the modifier P2A produced in Example D as starting materials were mixed evenly. The mixture was added to 1440 mL of an aqueous solution containing 10 mL nitric acid (a product available from Tianjin No. 3 Chemical Reagent Factory) and 2.4 g boric acid (calculated as B2O3). The resulting mixture was extruded on a twin-screw extruder into papilionaceous strips having an outer diameter φ of 1.4 mm. The resulting wet strips were dried at 120° C. for 4 hrs to produce shaped bodies. The shaped bodies were calcined at 900° C. for 3 hrs to produce the support SII-1. The properties of the support SII-1 were listed in Table D-3.

Support SII-2: 200 g of the hydrated alumina P1-1 and 800 g of the modifier P2B produced in Example 1) as starting materials were mixed evenly. The mixture was added to 1440 mL of an aqueous solution containing 10 mL nitric acid (a product available from Tianjin No. 3 Chemical Reagent Factory) and 2.4 g boric acid (calculated as B2O3). The resulting mixture was extruded on a twin-screw extruder into papilionaceous strips having an outer diameter φ of 1.4 mm. The resulting wet snips were dried at 120° C. for 4 hrs to produce shaped bodies. The shaped bodies were calcined at 900° C. for 3 hrs to produce the support SII-2. The properties of the support SII-2 were listed in Table D-3.

Support SII-3: 500 g of the hydrated alumina P1-1 and 500 g of the modifier P2C produced in Example D as starting materials were mixed evenly. The mixture was added to 1440 mL of an aqueous solution containing 10 mL nitric acid (a product available from Tianjin No. 3 Chemical Reagent Factory) and 2.4 g boric acid (calculated as B2O3). The resulting mixture was extruded on a twin-screw extruder into papilionaceous strips having an outer diameter φ of 1.4 mm. The resulting wet strips were dried at 120° C. for 4 hrs to produce shaped bodies. The shaped bodies were calcined at 950° C. for 3 hrs to produce the support SII-3. The properties of the support SII-3 were listed in Table D-3.

Support SII-4: 800 g of the hydrated alumina P1-2 and 200 g of the modifier P2D produced in Example D as starting materials were mixed evenly. The mixture was added to 1440 mL of an aqueous solution containing 10 mL nitric acid (a product available from Tianjin No. 3 Chemical Reagent Factory) and 14 g boric acid (calculated as B2O3). The resulting mixture was extruded on a twin-screw extruder into papilionaceous strips having an outer diameter φ of 1.4 mm. The resulting wet strips were dried at 120° C. for 4 hrs to produce shaped bodies. The shaped bodies were calcined at 1000° C. for 3 hrs to produce the support SI-4. The properties of the support SII-4 were listed in Table D-3.

Support SII-5: 900 g of the hydrated alumina P1-1 and 100 g of the modifier P2E produced in Example D as starting materials were mixed evenly. The mixture was added to 1440 mL of an aqueous solution containing 10 mL nitric acid (a product available from Tianjin No. 3 Chemical Reagent Factory) and 14 g boric acid (calculated as B2O3). The resulting mixture was extruded on a twin-screw extruder into papilionaceous strips having an outer diameter φ of 1.4 mm. The resulting wet strips were dried at 120° C. for 4 hrs to produce shaped bodies. The shaped bodies were calcined at 1000° C. for 3 hrs to produce the support SII-5. The properties of the support SII-5 were listed in Table D-3.

Support SII-6: 850 g of the hydrated alumina P1-2 and 150 g of the modifier P2C produced in Example D as starting materials were mixed evenly. The mixture was added to 1440 mL of an aqueous solution containing 10 mL nitric acid (a product available from Tianjin No. 3 Chemical Reagent Factory) and 14 g boric acid (calculated as B2O3). The resulting mixture was extruded on a twin-screw extruder into papilionaceous strips having an outer diameter φ of 1.4 mm. The resulting wet strips were dried at 120° C. for 4 hrs to produce shaped bodies. The shaped bodies were calcined at 850° C. for 3 his to produce the support SII-6. The properties of the support SII-6 were listed in Table D-3.

Support SII-7: 900 g of the hydrated alumina P1-2 and 100 g, of the modifier P2D produced in Example D as starting materials were mixed evenly. The mixture was added to 1440 mL of an aqueous solution containing 10 mL nitric acid (a product available from Tianjin No. 3 Chemical Reagent Factory) and 28 g boric acid (calculated as B2O3). The resulting mixture was extruded on a twin-screws extruder into papilionaceous strips having an outer diameter φ of 1.4 mm. The resulting wet strips were dried at 120° C. for 4 hrs to produce shaped bodies. The shaped bodies were calcined at 1000° C. for 3 hrs to produce the support SII-7. The properties of the support SII-7 were listed in Table D-3.

Support SII-8: 850 g of the hydrated alumina P1-2 and 150 g of the modifier P2E produced in Example D as starting materials were mixed evenly. The mixture was added to 1440 mL of an aqueous solution containing 10 mL nitric acid (a product available from Tianjin No. 3 Chemical Reagent Factory) and 28 g boric acid (calculated as B2O3). The resulting mixture was extruded on a twin-screw extruder into papilionaceous strips having an outer diameter ϕ of 1.4 mm. The resulting wet strips were dried at 120° C. for 4 hrs to produce shaped bodies. The shaped bodies were calcined at 900° C. for 3 hrs to produce the support SII-8. The properties of the support SII-8 were listed in Table D-3.

Comparative support CSII-1: 1000 g of the hydrated alumina P1-1 was added to 1440 mL of an aqueous solution containing 10 mL nitric acid (a product available from Tianjin No. 3 Chemical Reagent Factory) and 2.4 g boric acid (calculated as B2O3). The resulting mixture was extruded on a twin-screw extruder into papilionaceous strips having an outer diameter (13 of 1.4 mm. The resulting wet strips were dried at 120° C. for 4 hrs to produce shaped bodies. The shaped bodies were calcined at 900° C. for 3 hrs to produce the comparative support CSII-1. The properties of the comparative support CSII-1 were listed in Table D-3.

Comparative support CSII-2: 1000 g of the hydrated alumina P1-2 was added to 1440 mL of an aqueous solution containing 10 mL nitric acid (a product available from Tianjin No. 3 Chemical Reagent Factory) and 14 g boric acid (calculated as B2O3). The resulting mixture was extruded on a twin-screw extruder into papilionaceous strips having an outer diameter ϕ of 1.4 mm. The resulting wet strips were, dried at 120° C. for 4 hrs to produce shaped bodies. The shaped bodies were calcined at 1000° C. for 3 hrs to produce the comparative support CSII-2. The properties of the comparative support CSII-2 were listed in Table D-3.

Comparative support CSII-3: According to the procedure provided in Example 9 of CN1782031A, the mixture was extruded on a twin-screw extruder into papilionaceous strips having an outer diameter ϕ of 1.4 mm. The resulting wet strips were dried at 120° C. for 4 hrs to produce shaped bodies. The shaped bodies were calcined at 900° C. for 3 hrs to produce the comparative support CSII-3. The properties of the comparative support CSII-3 were listed in Table D-3.

TABLE D-3

| Support | B2O3, wt % | Specific surface area/ (m2/g) | Pore volume measured by mercury porosimetry/ (mL/g) | Percent of the 10 nm-30 nm pore volume relative to the total pore volume/% | Percent of the 300 nm-500 nm pore volume relative to the total pore volume/% |
|---|---|---|---|---|---|
| Support SII-1 | 0.34 | 175 | 1.07 | 65 | 28 |
| Support SII-2 | 0.34 | 148 | 1.15 | 59 | 32 |
| Support SII-3 | 0.34 | 143 | 1.14 | 60 | 29 |
| Support SII-4 | 2.0 | 125 | 1.17 | 64 | 31 |
| Support SII-5 | 2.0 | 132 | 1.11 | 63 | 26 |
| Support SII-6 | 2.0 | 162 | 1.09 | 64 | 20 |
| Support SII-7 | 4.0 | 115 | 1.10 | 61 | 26 |
| Support SII-8 | 4.0 | 141 | 1.01 | 60 | 19 |
| Comparative support CSII-1 | 0.34 | 218 | 0.87 | 78 | 0 |
| Comparative support CSII-2 | 2.0 | 220 | 0.90 | 80 | 0 |
| Comparative support CSII-3 | / | 165 | 1.08 | 42.3 | 10.2 |

Preparation of the Hydrogenation Demetalling Catalyst CII

With the following procedures, the hydrogenation demetalling catalysts CIIs and the comparative hydrogenation demetalling catalysts CCIIs as shown in Table D-4 were obtained.

Hydrogenation demetalling catalyst 200 g of the support SII-1 was impregnated in 210 mL of a mixed solution of molybdenum oxide and basic cobalt carbonate (having a molybdenum content, calculated as MoO3, of 67.9 g/L, and a cobalt content, calculated as CoO, of 11.3 g/L) for 1 hr. The impregnated support was dried at 120° C. for 2 hrs and calcined at 420° C. for 3 hrs to produce the hydrogenation demetalling catalyst CII-1. The molybdenum content and the cobalt content of the hydrogenation demetalling catalyst CII-1 (calculated as MoO3 and CoO respectively) were listed in Table D-4.

Hydrogenation demetalling catalyst CII-2: 200 g of the support SII-2 was impregnated in 200 mL of a mixed solution of molybdenum oxide and basic nickel carbonate (having a molybdenum content, calculated as MoO3, of 53.1 g/L, and a nickel content, calculated as NiO, of 10.6 g/L) for 1 hr. The impregnated support was dried at 120° C. for 2 hrs and calcined at 420° C. for 3 hrs to produce the hydrogenation demetalling catalyst CII-2. The molybdenum content and the nickel content of the hydrogenation demetalling catalyst CII-2 (calculated as MoO3 and NiO respectively) were listed in Table D-4.

Hydrogenation demetalling catalyst CII-3; 200 g of the support SII-3 was impregnated in 205 mL of a mixed solution of ammonium molybdate and nickel nitrate (having a molybdenum content, calculated as MoO3, of 78.5 g/L, and a nickel content, calculated as NiO, of 15.7 g/L) for 1 hr. The impregnated support was dried at 120° C. for 2 hrs and calcined at 420° C. for 3 hrs to produce the hydrogenation demetalling catalyst CII-3. The molybdenum content and the nickel content of the hydrogenation demetalling catalyst CII-3 (calculated as MoO3 and NiO respectively) were listed in Table D-4.

Hydrogenation demetalling catalyst CII-4: 200 g of the support SII-4 was impregnated in 210 mL of a mixed solution of molybdenum oxide and basic nickel carbonate (having a molybdenum content, calculated as MoO3 of 67.9 g/L and a nickel content, calculated as NiO, of 11.3 g/L) for 1 hr. The impregnated support was dried at 120° C. for 2 hrs and calcined at 420° C. for 3 hrs to produce the hydrogenation demetalling catalyst CII-4. The molybdenum content and the nickel content of the hydrogenation demetalling catalyst CII-4 (calculated as MoO3 and NiO respectively) were listed in Table D-4.

Hydrogenation demetalling catalyst CII-5: 200 g of the support SII-8 was impregnated in 200 mL of a mixed solution of molybdenum oxide and basic cobalt carbonate (having a molybdenum content, calculated as MoO3, of 82.8 g/L, and a cobalt content, calculated as CoO, of 19.1 g/L) for 1 hr. The impregnated support was dried at 120° C. for 2 hrs and calcined at 420° C. for 3 hrs to produce the hydrogenation demetalling catalyst CII-5. The molybdenum content and the cobalt content of the hydrogenation demetalling catalyst CII-5 (calculated as MoO3 and CoO respectively) were listed in Table D-4.

Comparative hydrogenation demetalling catalyst CCII-1: 200 g of the comparative support CSII-1 was impregnated in 180 mL of a mixed solution of molybdenum oxide and basic cobalt carbonate (having a molybdenum content, calculated as MoO3, of 79.2 g/L, and a cobalt content, calculated as CoO, of 13.2 g/L) for 1 hr. The impregnated support was dried at 120° C. for 2 hrs and calcined at 420° C. for 3 hrs to produce the comparative catalyst CCII-1. The molybdenum content and the cobalt content of the comparative catalyst CCII-1 (calculated as MoO3 and CoO respectively) were listed in Table D-4.

Comparative hydrogenation demetalling catalyst CCII-2: 200 g of the comparative support CSII-1 was impregnated in 180 mL of a mixed solution of molybdenum oxide and basic nickel carbonate (having a molybdenum content, calculated as MoO3, of 59.0 g/l and a nickel content, calculated as NiO, of 11.8 g/L) for 1 hr. The impregnated support was dried at 120° C. for 2 hrs and calcined at 420° C. for 3 hrs to produce the comparative catalyst CCII-2. The molybdenum content and the nickel content of the comparative catalyst CCII-2 (calculated as MoO3 and NiO respectively) were listed in Table D-4.

Comparative hydrogenation demetalling catalyst CCII-3: 200 g of the comparative support CSII-2 was impregnated in 180 mL of a mixed solution of molybdenum oxide and basic nickel carbonate (having a molybdenum content, calculated as MoO3, of 87.2 g/L, and a nickel content, calculated as NiO, of 17.4 g/L) for 1 hr. The impregnated support was dried at 120° C. for 2 hrs and calcined at 420° C. for 3 hrs to produce the comparative catalyst CCII-3. The molybdenum content and the nickel content of the comparative catalyst CCII-3 (calculated as MoO3 and NiO respectively) were listed in Table D-4.

Comparative hydrogenation demetalling catalyst CCII-4: 200 g of the comparative support CSII-3 was impregnated in 200 mL of a mixed solution of molybdenum oxide and basic cobalt carbonate (having a molybdenum content, calculated as MoO3, of 82.8 g/L, and a cobalt content, calculated as CoO, of 19.1 g/L) for 1 hr. The impregnated support was dried at 120° C. for 2 hrs and calcined at 420° C. for 3 hrs to produce the comparative catalyst CCII-4. The molybdenum content and the cobalt content of the comparative catalyst CCII-4 (calculated as MoO3 and CoO respectively) were listed in Table D-4.

TABLE D-4

| Catalyst | support | Metal oxide content (wt %) | | |
|---|---|---|---|---|
| | | MoO3 | NiO | CoO |
| CII-1 | support SII-1 | 6.6 | | 1.1 |
| CII-2 | support SII-2 | 5.0 | 1.0 | |
| CII-3 | support SII-3 | 7.3 | 1.5 | |
| CII-4 | support SII-4 | 6.6 | | 1.1 |
| CII-5 | support SII-8 | 7.8 | | 1.8 |
| CCII-1 | comparative support CSII-1 | 6.6 | | 1.1 |
| CCII-2 | comparative support CSII-1 | 5.0 | 1.0 | |
| CCII-3 | comparative support CSII-2 | 7.3 | 1.5 | |
| CCII-4 | comparative support CSII-3 | 7.8 | | 1.8 |

Hydrogenation Treatment Catalyst CIII

Hydrogenation treatment catalyst CIII-1: the hydrogenation treatment catalyst CIII-1 was prepared according to the method disclosed in the Chinese application ZL97112397, and contained 3 wt % of nickel (calculated as NiO), 25 wt % of tungsten (calculated as WO3), 2 wt % of fluorine (calculated as F), and the balance of alumina.

Hydrogenation treatment catalyst CIII-2: the hydrogenation treatment catalyst CIII-2 was prepared according to the method disclosed in the Chinese application ZL97112397, and contained 4 wt % of nickel (calculated as NiO), 30 wt % of tungsten (calculated as WO3), 2 wt % of fluorine (calculated as F), and the balance of alumina.

Hydrogenation treatment catalyst CIII-3: the hydrogenation treatment catalyst CIII-3 was prepared according to the method disclosed in the Chinese application ZL00802168, and contained 3.5 wt % of nickel (calculated as NiO), 18 wt % of molybdenum (calculated as MoO3), and the balance of alumina.

The effects of hydrogenating the heavy residual oil with the combinations of the above catalysts were illustrated by the following examples.

A mixed residual oil having a Ni+V content of 184 ppmw, a sulfur content of 3.7 wt %, and a residual carbon content of 12 wt % was used as raw oil D. The performances of the combinations of the above catalysts were evaluated with a 500 mL faxed bed reactor.

The contents of Ni and V in the oil sample were measured according to RIPP 124-90.

The sulfur content in the oil sample was measured according to RIPP 62-90.

The content of the residual carbon in the oil sample was measured according to RIPP 149-90.

Example D-1

The above raw oil D was hydrogenated with the catalyst combination of the hydrogenation demetalling catalyst CI-1, the hydrogenation demetalling catalyst CII-1 and the hydrogenation treatment catalyst CIII-1.

In this catalyst combination, the charging volume ratio of three catalysts in the reactor and the operation conditions were listed in Table D-5. After a 3000-hour operation, a sample was taken from the reactor and analyzed. The product properties were also listed in Table D-5.

Example D-2

The above raw oil D was hydrogenated with the catalyst combination of the hydrogenation demeaning catalyst CI-2, the hydrogenation demetalling catalyst CII-2 and the hydrogenation treatment catalyst CIII-2.

In this catalyst combination, the charging volume ratio of three catalysts in the reactor and the operation conditions were listed in Table D-5. After a 3000-hour operation, a sample was taken from the reactor and analyzed. The product properties were also listed in Table D-5.

Example D-3

The above raw oil D was hydrogenated with the catalyst combination of the hydrogenation demetalling catalyst CI-3, the hydrogenation demetalling catalyst CII-3 and the hydrogenation treatment catalyst CIII-3.

In this catalyst combination, the charging volume ratio of three catalysts in the reactor and the operation conditions were listed in Table D-5. After a 3000-hour operation, a sample was taken from the reactor and analyzed. The product properties were also listed in Table D-5.

Example D-4

The above raw oil D was hydrogenated with the catalyst combination of the catalyst RDM-2 produced by Sinopec Changling Catalyst Division as the hydrogenation demetalling catalyst CI, the hydrogenation demetalling catalyst CII-3 and the hydrogenation treatment catalyst CIII-3.

In this catalyst combination, the charging volume ratio of three catalysts in the reactor and the operation conditions were listed in Table D-5. After a 3000-hour operation, a sample was taken from the reactor and analyzed. The product properties were also listed in Table D-5.

Example D-C1

The above raw oil D was hydrogenated with the catalyst combination of the hydrogenation demetalling catalyst CI-1 the hydrogenation treatment catalyst CIII-1. In this catalyst combination, the charging volume ratio of two catalysts in the reactor and the operation conditions were listed in Table D-5. After a 3000-hour operation, a sample was taken from the reactor and analyzed. The product properties were also listed in Table D-5.

Example D-C2

The above raw oil D was hydrogenated with the catalyst combination of the hydrogenation demetalling catalyst CI-1, the comparative hydrogenation demetalling catalyst CCII-3 and the hydrogenation treatment catalyst CIII-1.

In this catalyst combination, the charging volume ratio of three catalysts in the reactor and the operation conditions were listed in Table D-5. After a 3000-hour operation, a sample was taken from the reactor and analyzed. The product properties were also listed in Table D-5.

Example D-C3

The above raw oil D was hydrogenated with the catalyst combination of the catalyst RDM-2 produced by Sinopec Changling Catalyst Division as the hydrogenation demetalling catalyst CI, the comparative hydrogenation demetalling catalyst CCII-4, and the hydrogenation treatment catalyst CIII-1.

In this catalyst combination, the charging volume ratio of three catalysts in the reactor and the operation conditions were listed in Table D-5. After a 3000-hour operation, a sample was taken from the reactor and analyzed. The product properties were also listed in Table D-5.

TABLE D-5

|  | Example | | | | | | |
| --- | --- | --- | --- | --- | --- | --- | --- |
|  | D-1 | D-2 | D-3 | D-4 | D-C1 | D-C2 | D-C3 |
| hydrogenation demetalling catalyst CI, % | 15 | 25 | 35 | 25 | 50 | 25 | 15 |
| hydrogenation demetalling catalyst CII, % | 35 | 35 | 30 | 35 | — | 30 | 40 |
| hydrogenation treatment catalyst CIII, % | 50 | 40 | 35 | 40 | 50 | 45 | 45 |
| Hydrogen/oil volume ratio | 800 | 850 | 750 | 900 | 800 | 900 | 850 |
| Hydrogen partial pressure/MPa | 14.0 | 15.0 | 13.8 | 15.0 | 14.0 | 14.0 | 14.0 |
| Reaction Temperature/° C. | 375 | 380 | 370 | 380 | 375 | 375 | 375 |
| Space velocity/h$^{-1}$ | 0.25 | 0.3 | 0.2 | 0.2 | 0.25 | 0.25 | 0.25 |
| After 5000-hour reaction |  |  |  |  |  |  |  |
| Pressure drop, kg | 0.35 | 0.3 | 0.4 | 0.5 | 0.8 | 2.0 | 2.5 |
| Product properties |  |  |  |  |  |  |  |
| Ni + V/µg · g$^{-1}$ | 9 | 12 | 13 | 15 | 27 | 42 | 33 |
| Sulfur content, wt % | 0.37 | 0.40 | 0.45 | 0.54 | 0.66 | 0.61 | 0.71 |
| Residual carbon content, wt % | 5.1 | 5.0 | 5.6 | 5.9 | 8.8 | 8.4 | 7.9 |

Example F

Hydrogenation Demetalling Catalyst CII

With the following procedures, using the supports SIIs mentioned in Table C-3 of Example C, the hydrogenation demetalling catalysts CIIs as shown in Table F-4 were obtained.

Hydrogenation demetalling catalyst CII-1: 200 g of the support SII-1 was impregnated in 220 mL of a mixed solution of ammonium molybdate and nickel nitrate (having a molybdenum content, calculated as MoO3, of 28.6 g/L, and a nickel content, calculated as NiO, of 5 g/L) for 1 hr. The impregnated support was dried at 120° C. for 4 hrs and calcined at 400° C. for 3 hrs to produce the hydrogenation demetalling catalyst CII-1. The molybdenum content and the nickel content of the hydrogenation demetalling catalyst CII-1 (calculated as MoO3 and NiO respectively) were listed in Table F-4.

Hydrogenation demetalling catalyst CII-2: 200 g of the support SII-2 was impregnated in 220 mL of ammonium metawolframate and nickel nitrate (having a tungsten content, calculated as WO3, of 28.6 g/L, and a nickel content, calculated as NiO, of 5 g/L) for 1 hr. The impregnated support was dried at 120° C. for 4 hrs and calcined at 400° C. for 3 hrs to produce the hydrogenation demetalling catalyst CII-2. The tungsten content and the nickel content of the hydrogenation demetalling catalyst CII-2 (calculated as WO3 and NiO respectively) were listed in Table F-4.

Hydrogenation demetalling catalyst CII-3: 200 g of the support SII-3 was impregnated in 220 mL of a mixed solution of ammonium molybdate and nickel nitrate (having a molybdenum content, calculated as MoO3, of 25 g/L, and a nickel content, calculated as NiO, of 3 g/L) for 1 hr. The impregnated support was dried at 120° C. for 4 hrs and calcined at 400° C. for 3 hrs to produce the hydrogenation demetalling catalyst CII-3. The molybdenum content and the nickel content of the hydrogenation demetalling catalyst CII-3 (calculated as MoO3 and NiO respectively) were listed in Table F-4.

Hydrogenation demetalling catalyst CII-4: 200 g of the support SII-4 was impregnated in 220 mL of a mixed solution of ammonium molybdate and cobalt nitrate (having a molybdenum content, calculated as MoO3, of 25 g/L, and a cobalt content, calculated as CoO, of 3 g/L) for 1 hr. The impregnated support was dried at 120° C. for 4 hrs and calcined at 400° C. for 3 hrs to produce the hydrogenation demetalling catalyst CII-4. The molybdenum content and the cobalt content of the hydrogenation demetalling catalyst CII-4 (calculated as MoO3 and CoO respectively) were listed in Table F-4.

Hydrogenation demetalling catalyst CII-5: 200 g of the support SII-5 was impregnated in 220 mL of a mixed solution of ammonium molybdate and nickel nitrate (having a molybdenum content, calculated as MoO3, of 19.0 g/L, and a nickel content, calculated as NiO, of 2 g/L) for 1 hr. The impregnated support was dried at 120° C. for 4 hrs and calcined at 400° C., for 3 hrs to produce the hydrogenation demetalling catalyst CII-5. The molybdenum content and the nickel content of the hydrogenation demetalling catalyst CII-5 (calculated as MoO3 and NiO respectively) were listed in Table F-4.

Hydrogenation demetalling catalyst CII-6: 200 g of the support SII-8 was impregnated in 220 mL of ammonium metawolframate and nickel nitrate (having a tungsten content, calculated as WO3, of 19.0 g/L, and a nickel content, calculated as NiO, of 2 g/L) for 1 hr. The impregnated support was dried at 120° C. for 4 hrs and calcined at 400° C. for 3 hrs to produce the hydrogenation demetalling catalyst CII-6. The tungsten content and the nickel content of the hydrogenation demetalling catalyst CII-6 (calculated as WO3 and NiO respectively) were listed in Table F-4,

TABLE F-4

| Catalyst | Support | Metal oxide content, wt % | | | |
|---|---|---|---|---|---|
| | | WO3 | MoO3 | NiO | CoO |
| CII-1 | Support SII-1 | | 3.0 | 0.5 | |
| CII-2 | Support SII-2 | 3.0 | | 0.5 | |
| CII-3 | Support SII-3 | | 2.7 | 0.3 | |
| CII-4 | Support SII-4 | | 2.7 | | 0.3 |
| CII-5 | Support SII-5 | | 2.0 | 0.2 | |
| CII-6 | Support SII-8 | 2.0 | | 0.2 | |

The effects of hydrogenating the heavy residual oil with the combinations of the above catalysts were illustrated by the following examples.

A mixed residual oil having a Ni+V content of 178 ppmw, a sulfur content of 3.9 wt %, and a residual carbon content of 12 wt % was used as raw oil F. The performances of the combinations of the above catalysts were evaluated with a 500 mL fixed bed reactor.

The contents of Ni and V in the oil sample were measured according to RIPP 124-90.

The sulfur content in the oil sample was measured according to RIPP 62-90.

The content of the residual carbon in the oil sample was measured according to RIPP 149-90.

In the following examples, the hydrogenation demetalling catalysts CIs and the hydrogenation treatment catalysts CIIIs are those mentioned in Example C. The hydrogenation demetalling catalysts CII; are those mentioned in the above Example F.

Example F-1

The above raw oil F was hydrogenated with the catalyst combination of the hydrogenation demetalling catalyst CI-1, the hydrogenation demetalling catalyst CII-1 and the hydrogenation treatment catalyst CIII-1.

In this catalyst combination, the charging volume ratio of three catalysts in the reactor and the operation conditions were listed in Table F-5. After a 3000-hour operation, a sample was taken from the reactor and analyzed. The product properties were also listed in Table F-5.

Example F-2

The above raw oil F was hydrogenated with the catalyst combination of the hydrogenation demetalling catalyst CI-2, the hydrogenation demetalling catalyst CII-2 and the hydrogenation treatment catalyst CIII-2.

In this catalyst combination, the charging volume ratio of three catalysts in the reactor and the operation conditions were listed in Table F-5. After a 3000-hour operation, a sample was taken from the reactor and analyzed. The product properties were also listed in Table F-5.

Example F-3

The above raw oil F was hydrogenated with the catalyst combination of the hydrogenation demetalling catalyst CI-3, the hydrogenation demetalling catalyst CII-3 and the hydrogenation treatment catalyst CIII-3.

In this catalyst combination, the charging volume ratio of three catalysts in the reactor and the operation conditions were listed in Table F-5. After a 3000-hour operation, a sample was taken from the reactor and analyzed. The product properties were also listed in Table F-5.

Example F-4

The above raw oil F was hydrogenated with the catalyst combination of the catalyst RDM-2 produced by Sinopec Changling Catalyst Division as the hydrogenation demetalling catalyst CI, the hydrogenation demetalling catalyst CII-3 and the hydrogenation treatment catalyst CIII-3.

In this catalyst combination, the charging volume ratio of three catalysts in the reactor and the operation conditions were listed in Table F-5. After a 3000-hour operation, a sample was taken from the reactor and analyzed. The product properties were also listed in Table F-5.

TABLE F-5

| Example | F-1 | F-2 | F-3 | F-4 |
|---|---|---|---|---|
| hydrogenation demetalling catalyst CI, % | 15 | 25 | 35 | 30 |
| hydrogenation demetalling catalyst CII, % | 35 | 35 | 20 | 25 |
| hydrogenation treatment catalyst CIII, % | 50 | 40 | 45 | 45 |
| Hydrogen/oil volume ratio | 800 | 850 | 750 | 900 |
| Hydrogen partial pressure/MPa | 14.0 | 15.0 | 13.8 | 15.0 |

TABLE F-5-continued

| Example | F-1 | F-2 | F-3 | F-4 |
|---|---|---|---|---|
| Reaction Temperature/° C. | 375 | 380 | 370 | 380 |
| Space velocity/h⁻¹ | 0.25 | 0.3 | 0.2 | 0.2 |
| After 5000-hour reaction | | | | |
| Pressure drop, kg | 0.4 | 0.3 | 0.35 | 0.5 |
| Product properties | | | | |
| Ni + V/μg · g⁻¹ | 10.7 | 11.8 | 9.2 | 15.4 |
| Sulfur content, wt % | 0.31 | 0.38 | 0.40 | 0.48 |
| Residual carbon content, wt % | 4.8 | 4.8 | 5.4 | 5.8 |

The invention claimed is:

1. A catalyst combination for hydrotreating raw oils, comprising:
   one or both of at least one hydrogenation protection catalyst I and at least one hydrogenation demetalling catalyst I;
   at least one hydrogenation demetalling catalyst II; and
   at least one hydrogenation treatment catalyst III;
   wherein a volume percentage of said hydrogenation demetalling catalyst II in said catalyst combination, based on a total volume of the catalyst combination, is 5-50%;
   wherein said hydrogenation demetalling catalyst II comprises a shaped alumina support, the support has a pore volume measured by the mercury porosimetry of 0.9-1.2 mL/g, a specific surface area of 50-300 m²/g, a ratio of the volume of the pores having a diameter of 10 nm-30 nm to the total pore volume of 55-80%, and a ratio of the volume of the pores having a diameter of 300 nm-500 nm to the total pore volume of 18-35%.

2. The catalyst combination of claim 1, wherein the catalyst combination comprises the hydrogenation protection catalyst I, the hydrogenation demetalling catalyst II and the hydrogenation treatment catalyst III, wherein, based on the total volume of the catalyst combination, a volume percentage of the hydrogenation protection catalyst I is 5-60%, the volume percentage of the hydrogenation demetalling catalyst II is 5-50%, and a volume percentage of the hydrogenation treatment catalyst III is 10-60%; the hydrogenation protection catalyst I has a bed voidage of 25-60%; or
   the catalyst combination comprises the hydrogenation demetalling catalyst I, the hydrogenation demetalling catalyst II and the hydrogenation treatment catalyst III, wherein, based on the total volume of the catalyst combination, a volume percentage of the hydrogenation demetalling catalyst I is 5-60%, a volume percentage of the hydrogenation demetalling catalyst II is 5-50%, and a volume percentage of the hydrogenation treatment catalyst III is 10-60%.

3. The catalyst combination of claim 1, wherein the hydrogenation protection catalyst I comprises at least one hydrogenation active metal element and a support,
   wherein the hydrogenation active metal element of the hydrogenation protection catalyst I comprises at least one metal element selected from the group consisting of the metal elements in the group VIII of the Periodic Table and at least one metal element selected from the group consisting of the metal elements in the group VIB of the Periodic Table,
   wherein, calculated as oxide and based on a weight of the hydrogenation protection catalyst I, the weight percentage of the metal element in the group VIII of the Periodic Table is from more than zero to no more than 5 wt %,
   wherein, calculated as oxide and based on a weight of the hydrogenation protection catalyst I, the weight percentage of the metal element in the group VIB of the Periodic Table is from more than zero to no more than 10 wt %, and
   wherein the support has a crushing strength of 20-300 N/particle, a pore volume of 0.3-0.9 mL/g, and a specific surface area of from more than 30 m²/g to no more than 150 m²/g.

4. The catalyst combination of claim 1, wherein the hydrogenation protection catalyst I has a support that is a titanium oxide-alumina shaped body, and the support of the hydrogenation protection catalyst I has an alumina weight percentage of 70-99 wt %, and a titanium oxide weight percentage of 1-30 wt %, based on a weight of the support.

5. The catalyst combination of claim 1, wherein the hydrogenation demetalling catalyst I comprises a support that is a shaped alumina support and at least one hydrogenation active metal element,
   wherein the shaped alumina support has a total pore volume of 0.8 mL/g-1.2 mL/g, a specific surface area of 90 m²/g-230 m²/g, an average pore diameter of 25 nm-35 nm, and a ratio of the volume of the pores having a diameter of 10 nm-60 nm to the total pore volume of 95%-99.8%,
   wherein the at least one hydrogenation active metal element of the hydrogenation demetalling catalyst I comprises at least one metal element selected from the group consisting of the metal elements in the group VIII of the Periodic Table and at least one metal element selected from the group consisting of the metal elements in the group VIB of the Periodic Table,
   wherein, calculated as oxide and based on a weight of the hydrogenation demetalling catalyst I, the weight percentage of the metal element in the group VIII of the Periodic Table is from more than zero to no more than 5 wt %; and
   wherein, calculated as oxide and based on a weight of the hydrogenation demetalling catalyst I, the weight percentage of the metal element in the group VIB of the Periodic Table is from more than zero to no more than 15 wt %.

6. The catalyst combination of claim 1, wherein the hydrogenation demetalling catalyst II comprises at least one hydrogenation active metal element, wherein the at least one hydrogenation active metal element of the hydrogenation demetalling catalyst II is a combination of at least one metal element selected from the group consisting of the metal elements in the group VIII of the Periodic Table and at least one metal element selected from the group consisting of the metal elements in the group VIB of the Periodic Table, and
   wherein, calculated as oxide and based on a weight of the hydrogenation demetalling catalyst II, the weight percentage of the metal element in the group VIII of the Periodic Table is from more than zero to more than 3 wt %; and, calculated as oxide and based on the weight of the hydrogenation demetalling catalyst II, the weight percentage of the metal element in the group VIB of the Periodic Table is from more than zero to no more than 15 wt %.

7. The catalyst combination of claim 1, wherein the hydrogenation treatment catalyst III comprises
   at least one support selected from the group consisting of alumina, silica-alumina, and a combination thereof;

at least one hydrogenation active metal element selected from the group consisting of nickel, cobalt, molybdenum, tungsten and a combination thereof; and optionally at least one auxiliary agent selected from the group consisting of fluorine, boron, phosphorus, and a combination thereof.

8. The catalyst combination of claim 1, wherein said hydrogenation demetalling catalyst II comprises a shaped boron-containing alumina support, wherein the support has a boron weight percentage of 0.1-6 wt %, calculated based on $B_2O_3$.

9. The catalyst combination of claim 1, wherein the support of hydrogenation demetalling catalyst II has a ratio of the volume of the pores having a diameter of 10 nm-30 nm to the total pore volume of 55-72%.

10. The catalyst combination of claim 9, wherein the support of hydrogenation demetalling catalyst II has a ratio of the volume of the pores having a diameter of 10 nm-30 nm to the total pore volume of 59-66%.

11. The catalyst combination of claim 1, wherein the support of hydrogenation demetalling catalyst II has a ratio of the volume of the pores having a diameter of 300 nm-500 nm to the total pore volume of 26-32%.

12. The catalyst combination of claim 6, wherein the weight percentage of the metal element in the group VIII of the Periodic Table is from more than zero to no more than 0.8 wt %, and the weight percentage of the metal element in the group VIB of the Periodic Table is from more than zero to no more than 4 wt %.

13. The catalyst combination of claim 12, wherein the weight percentage of the metal element in the group VIII of the Periodic Table is from more than 0.1 to no more than 0.6 wt %, and the weight percentage of the metal element in the group VIB of the Periodic Table is from more than 1.5 to no more than 3.5 wt %.

14. The catalyst combination of claim 6, wherein the metal element in the group VIII of the Periodic Table is nickel and/or cobalt; the metal element in the group VIB of the Periodic Table is molybdenum and/or tungsten.

15. The catalyst combination of claim 7, wherein the hydrogenation treatment catalyst III comprises nickel and/or cobalt, and molybdenum and/or tungsten, calculated as oxide and based on the catalyst III, the weight percentage of nickel and/or cobalt is 1-5 wt %, and the weight percentage of molybdenum and/or tungsten is 10-35 wt %;

wherein calculated as the element, the weight percentage of at least one auxiliary agent selected from the group consisting of fluorine, boron, phosphorus and a combination thereof is 0-9 wt %.

16. The catalyst combination of claim 1, wherein the shaped alumina support of hydrogenation demetalling catalyst II is prepared by mixing a pseudoboehmite-containing hydrated alumina P1 and a P1's modifier P2, optionally introducing a boron-containing compound, shaping the resulting mixture, and drying and calcining the resulting shaped bodies, wherein the weight mixing ratio of P1 to P2 is 20-95:5-80; wherein the P2 is prepared by one of the following methods:

(1) shaping the pseudoboehmite-containing hydrated alumina P1; drying the shaped bodies of P1 40-350° C. for 1-24 hrs, grounding and sieving some or all of the dried shaped bodies of P1 to obtain P2 as powder;

(2) calcining the shaped bodied obtained in the above (1) at a temperature of from 350° C. to no more than 1400° C. for 1-8 hrs, grounding and sieving some or all of the calcined shaped bodies of P1 to obtain P2 as powder;

(3) flash-drying the pseudoboehmite-containing hydrated alumina P1 at a temperature of from more than 150° C. to no more than 1400° C. for 0.05-1 hr to obtain P2 as powder; and (4) combining two or more powders obtained from the above (1), (2) and/or (3).

17. The catalyst combination of claim 1, wherein the shaped alumina support is produced by mixing a pseudoboehmite-containing hydrated alumina P1 and a modifier P2 made from the pseudoboehmite-containing hydrated alumina and drying and calcining the mixture comprising P1 and P2.

18. A process for hydrotreating raw oils, comprising:
contacting a heavy raw oil feedstock with the catalyst combination of claim 1 under a first set of conditions or a second set of conditions, wherein the first set of conditions comprises a hydrogen partial pressure of 6-20 MPa, a temperature of 300-450° C., a liquid-volume hourly space velocity of 0.1-1.0 $h^{-1}$, and a hydrogen/oil volume ratio of 600-1500, wherein the second set of conditions comprise a hydrogen partial pressure of 10-18 MPa, a temperature of 350-420° C., a liquid-volume hourly space velocity of 0.2-0.6 $h^{-1}$, and a hydrogen/oil volume ratio of 750-1100, and wherein the heavy raw oil feedstock comes into contact firstly with the hydrogenation protection catalyst I and/or the hydrogenation demetalling catalyst I, secondly with the hydrogenation demetalling catalyst II, and thirdly with the hydrogenation treatment catalyst III.

19. The process of claim 18, wherein said heavy raw oil comprises one or more components selected from the group consisting of an asphaltine content>7 wt %, a Fe+Ca content>20 ppmw, a Ni+V content>80 ppmw, a sulfur content>3 wt %, and a residual carbon content>10 wt %.

* * * * *